United States Patent
Footz et al.

(10) Patent No.: US 12,004,678 B2
(45) Date of Patent: Jun. 11, 2024

(54) BEVERAGE CAPSULE WITH FILTER REGISTRATION ELEMENT

(71) Applicant: Nexe Innovations Inc., Surrey (CA)

(72) Inventors: Darren Joseph Footz, Surrey (CA); Kevin Tsuyuki Tomlinson, Surrey (CA); Kian Karimi, Surrey (CA)

(73) Assignee: Nexe Innovations Inc., Surrey (CA)

( * ) Notice: Subject to any disclaimer, the term of this patent is extended or adjusted under 35 U.S.C. 154(b) by 177 days.

(21) Appl. No.: 17/369,641

(22) Filed: Jul. 7, 2021

(65) Prior Publication Data

US 2021/0401219 A1  Dec. 30, 2021

Related U.S. Application Data

(63) Continuation of application No. PCT/CA2020/050015, filed on Jan. 7, 2020.

(60) Provisional application No. 62/789,209, filed on Jan. 7, 2019.

(51) Int. Cl.
| | |
|---|---|
| *B65D 85/80* | (2006.01) |
| *A47J 31/06* | (2006.01) |
| *B01D 29/00* | (2006.01) |
| *B01D 29/11* | (2006.01) |
| *B01D 29/19* | (2006.01) |
| *B65B 29/02* | (2006.01) |
| *B65D 85/804* | (2006.01) |

(52) U.S. Cl.
CPC ......... *A47J 31/0673* (2013.01); *B01D 29/111* (2013.01); *B01D 29/19* (2013.01); *B65B 29/022* (2017.08); *B65D 85/8061* (2020.05)

(58) Field of Classification Search
CPC .............. B65D 85/8043; B65D 85/804; B65D 85/8046; B65D 85/8061; B65B 29/022; B01D 29/111; B01D 29/19
See application file for complete search history.

(56) References Cited

U.S. PATENT DOCUMENTS

| | | | |
|---|---|---|---|
| 5,028,327 A * | 7/1991 | Ostreicher ............ | B01D 29/111 |
| | | | 210/450 |
| 2002/0048621 A1* | 4/2002 | Boyd ................. | B65D 85/8046 |
| | | | 426/77 |
| 2007/0148290 A1 | 6/2007 | Ternite et al. | |
| 2010/0303964 A1 | 12/2010 | Beaulieu et al. | |
| 2011/0041702 A1* | 2/2011 | Yoakim ................ | B65D 65/466 |
| | | | 99/302 R |
| 2012/0097602 A1* | 4/2012 | Tedford ............... | B65D 65/466 |
| | | | 210/500.1 |

(Continued)

*Primary Examiner* — Ericson M Lachica
(74) *Attorney, Agent, or Firm* — Perkins Coie LLP

(57) ABSTRACT

The present disclosure relates to a beverage capsule for use in a brewed beverage machine including a piercing element, the capsule comprising: a container defining an interior volume including a base configured for being perforated upon contact with a piercing element; a filter assembly disposed in the interior volume and dividing the interior volume into a first chamber for receiving beverage ingredients and a brewing medium and a second chamber, the assembly comprising: a filter element; and a registration element disposed above the filter element and configured for disposing the filter assembly into the container, wherein the filter element separates the registration element from the second chamber and is arranged to be contacted and pierced by the piercing element.

24 Claims, 19 Drawing Sheets

(56) References Cited

U.S. PATENT DOCUMENTS

| | | | |
|---|---|---|---|
| 2013/0025466 A1* | 1/2013 | Fu | B65D 65/466 |
| | | | 99/295 |
| 2014/0072677 A1 | 3/2014 | Hansen | |
| 2014/0272018 A1* | 9/2014 | Koller | B65D 65/466 |
| | | | 426/115 |
| 2014/0287105 A1* | 9/2014 | Husband | B65D 85/8061 |
| | | | 426/115 |
| 2015/0020481 A1 | 1/2015 | Hodler | |
| 2015/0314955 A1* | 11/2015 | Savage | B65D 65/466 |
| | | | 426/115 |
| 2015/0336736 A1* | 11/2015 | Cabilli | B29C 45/0001 |
| | | | 264/494 |
| 2016/0001903 A1* | 1/2016 | Bartoli | B65B 29/02 |
| | | | 426/112 |
| 2016/0122122 A1* | 5/2016 | Empl | B65D 85/8043 |
| | | | 426/115 |
| 2016/0332805 A1* | 11/2016 | Krupa | B65D 65/466 |
| 2017/0355515 A1* | 12/2017 | Marcinkowski | A47J 31/407 |
| 2018/0118450 A1* | 5/2018 | Trombetta | B65D 85/8061 |
| 2018/0178973 A1* | 6/2018 | Kaiserman | B65D 85/8061 |

* cited by examiner

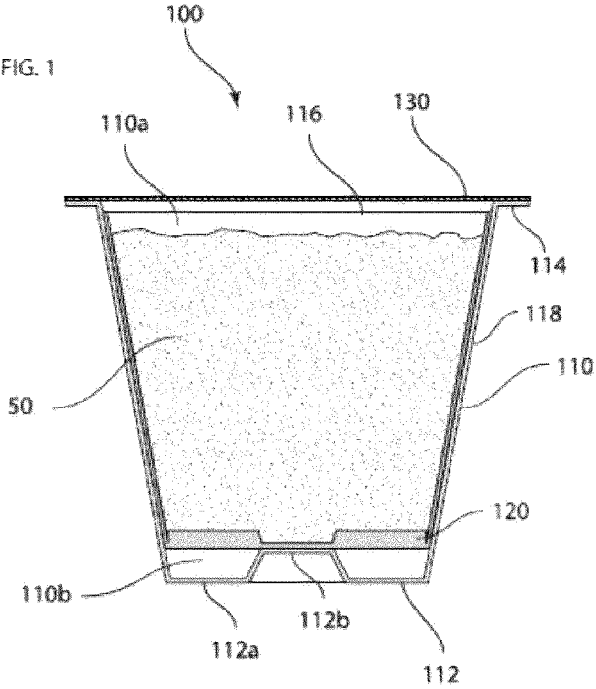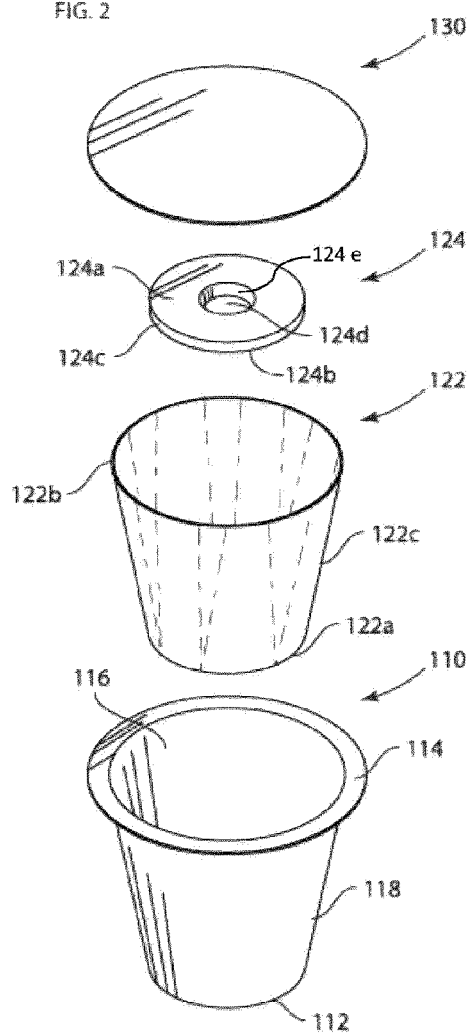

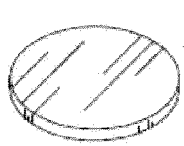 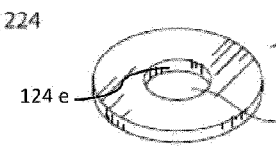 
FIG. 3(a)  FIG. 3(b)  FIG. 3(c)
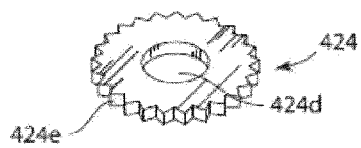 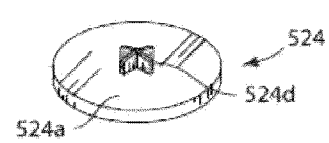
FIG. 3(d)  FIG. 3(e)
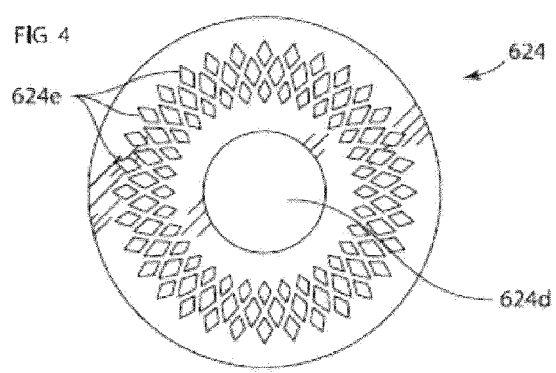
FIG. 4
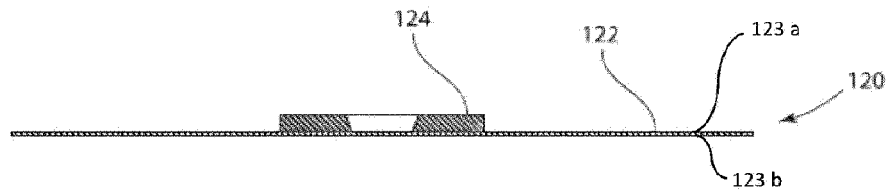
FIG. 5a
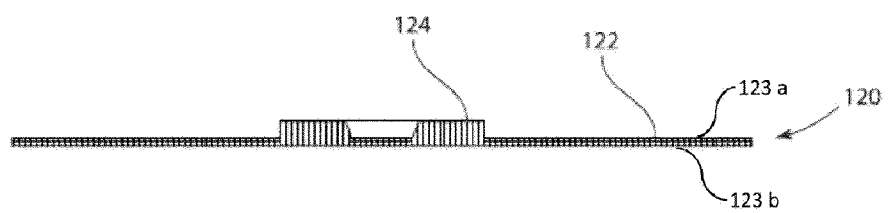
FIG. 5b

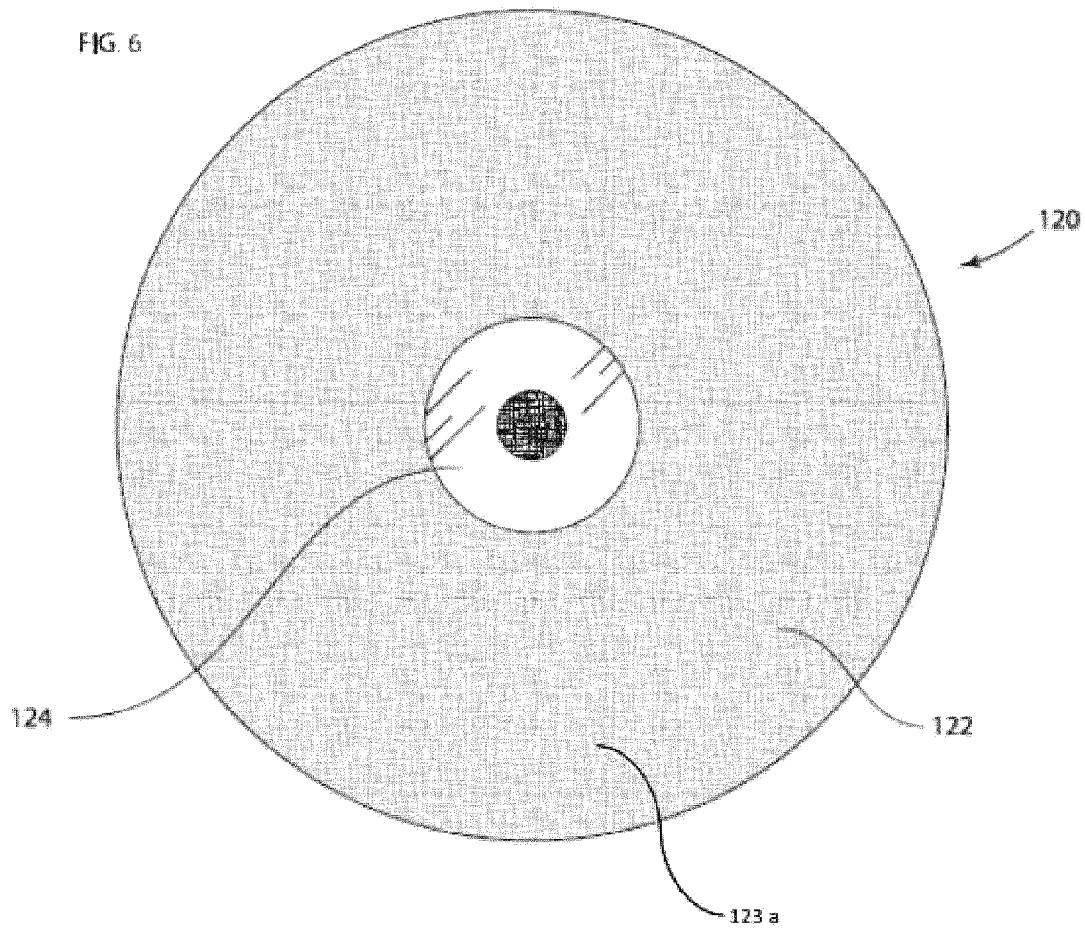

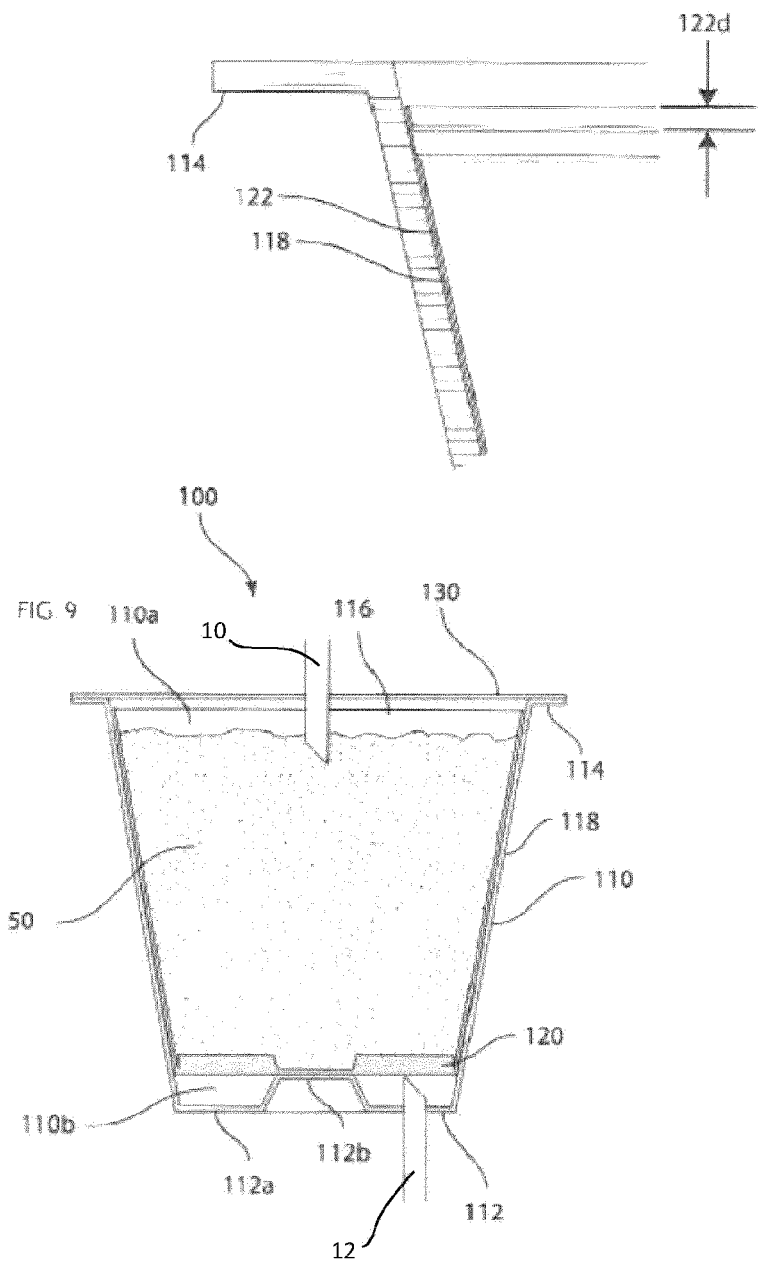

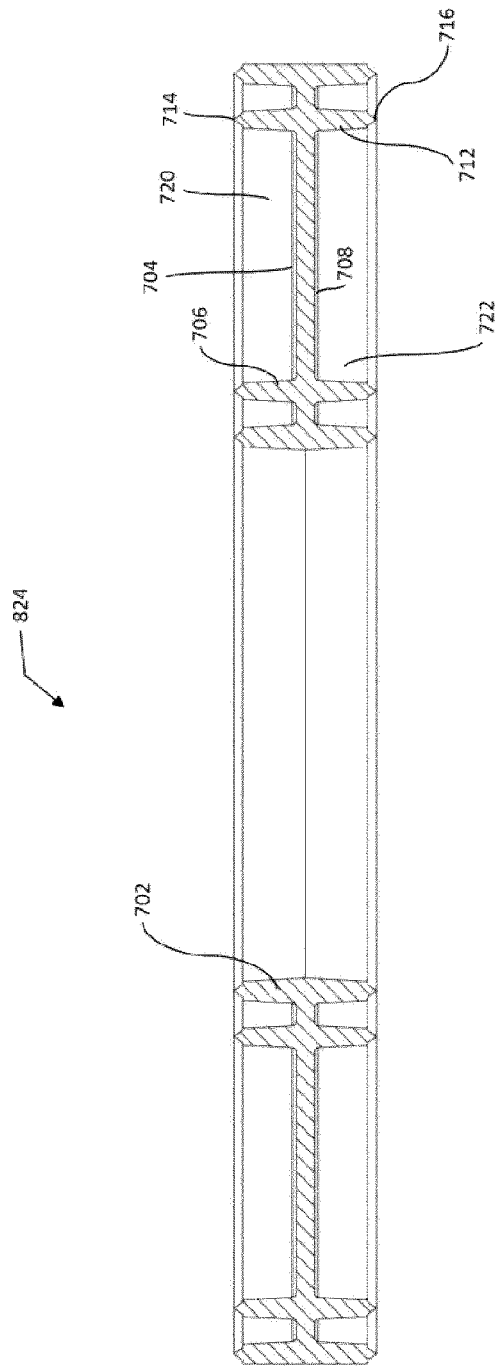

BEVERAGE CAPSULE WITH FILTER REGISTRATION ELEMENT

CROSS-REFERENCE TO RELATED APPLICATION(S)

This application is a continuation and claims priority benefit to Patent Cooperation Treaty No. PCT/CA2020/050015, filed Jan. 7, 2020, which claims priority benefit to U.S. provisional patent application 62/789,209 filed Jan. 7, 2019, which are incorporated herein by reference in their entirety for all purposes.

TECHNICAL FIELD

The present disclosure relates to a beverage capsule and a method of manufacturing thereof.

BACKGROUND

A single-serve beverage capsule generally comprises a container, a filter assembly comprising a filter element, and a lid. The filter assembly is disposed within the container and separates the container into two chambers: (i) a first chamber defined by the space within the container between an upper surface of the filter and an opening of the container; and (ii) a second chamber occupying the space within the container between a base of the container and a lower surface of the filter assembly that is opposite the upper surface of the filter. Disposed into the first chamber may be dry beverage ingredients such as, but not limited to, coffee, tea, and cocoa powder. The lid covers the opening of the container, and seals the filter and dry beverage ingredients within the container.

The filter assembly preferably has a number of desirable qualities including, but not limited to, tight tolerances and ideal positioning within a beverage capsule. Filter elements may be manufactured from various suitable materials including, but not limited to nonwoven web materials. However, maintaining a tight tolerance, wherein "tolerance" refers to the amount of uncertainty or variability allowed for a given physical dimension or property, in the formation of a filter assembly using nonwoven web materials can be difficult due to the physical and dimensional inconsistencies in the nonwoven web material itself. For example, spunbond nonwoven web materials are synthesized by depositing fine extruded filaments in a sheet formation through for example, but not limited to, mechanical oscillation, electrostatic charging, slot attenuators, air foils, full-width draw rolls, and centrifugal foaming. While approximate uniformity can be achieved through such manufacturing methods, the synthesized material nevertheless can have inherent variances in thickness and density which can render their passage through the filter formation tool (for example, but not limited to, a filter forming die) at a consistent rate difficult (see for example, U.S. Pat. No. 8,276,639). Indeterminately located thicker areas along the web surface of the spunbond nonwoven web materials of the filter element can cause disproportionately high drag in the flow of the material through the filter formation tool. Such drag may result in the die-cut filter web shifting off-center in relation to the filter formation tool, thereby causing non-uniform wall heights in the formed filter assemblies. This can be particularly relevant to filter webs that are die-cut to a specific diameter before being shaped or formed.

Non-uniform wall heights in the formed filter assemblies can create problems in the functionality of the single-serve beverage capsule. If the filter wall is too low, the filter can fall short of the sealing periphery and therefore result in beverage granules falling into the second chamber in between the filter and the sidewall of the container, contaminating the brewed beverage. If the filter wall is too high such that the filter extends beyond the height of the side walls and rim of the container, the filter may negatively affect the seal of the lid to the capsule by, for example, catching errant granules of beverage medium and/or interfering with the sealing interface between the container and lid; a weak or porous seal may result in blowouts along the seal when the beverage capsule is brewed within a brewing machine, thereby resulting in further potential contamination of the beverage ingredients in both the brewing machine and drinkable beverage.

Seating the filter assembly into a beverage capsule, wherein the bottom of the filter is located at a pre-defined optimal depth, is also a challenge. For example, the flexible nature of web materials of the filter element can make it challenging to ensure static dimensions at tight tolerances; filter elements that are formed with an array or arrays of pleats extending vertically along their side walls are affected by the elastic recovery of the filter web material, wherein the formed filter exhibits a slight return to its original flat state after being formed and disposed into the cup: causing the filter to expand and partially extricate itself from the beverage capsule, and thus resulting in an unintended seating depth. A filter that fails to sit at an appropriate filter depth can cause difficulties when a defined volume of beverage medium is added into the capsule. For example, an undesirably high-placed filter can reduce the intended volume of the first chamber of the capsule; as dry ingredients are added into the first chamber, errant beverage dry ingredients may spill along and beyond the rim of the container of the capsule. Displaced dry ingredients can negatively impact the quality of the seal of the lid to the container of the capsule and cause the capsule to lose beverage medium volume.

In an effort to ensure that the filter assembly is seated adequately deep enough in the container so that the top peripheral edge of the filter side wall does not interfere with sealing of the capsule or dosing of dry ingredients into the capsule, some capsule manufacturing machines (for example, U.S. Pat. No. 8,276,639) incorporate a tamping mechanism that contacts the top peripheral edge of the unwelded filter side wall. However, a filter with a variable side wall height may be tamped in a manner such that the longer portion of the filter side wall will force the bottom of the formed filter to seat lower than intended, thereby potentially causing the filter to fall within the puncturing depth of the brewing machine's fluid extractor needle into the capsule and risking damage to the filter. Conversely, the shorter portion of the filter side wall may fall below the sealing periphery during tamping of the filter, thereby potentially causing an imperfect seal between the filter assembly and the side wall of the container.

SUMMARY

The present disclosure relates to a beverage capsule and a method of manufacturing thereof. The present disclosure is also related to a filter assembly of the single-serve beverage capsule and a method of disposing the filter assembly within the single-serve beverage capsule.

The filter assembly disclosed herein is configured to have the desired tight tolerances. Such tight tolerances are achieved independent of the thickness (or uniformity thereof) of the filter element of the filter assembly. The methods disclosed herein do not require ultra-precise tension calibration of forming dies or the uniform thickness of nonwoven filter materials to control a symmetrical formation of a formed filter assembly. The filter assembly and method of manufacturing thereof disclosed herein provides the benefits of tight tolerances, lower manufacturing machine development cost, higher and more consistent machine uptime, and higher product yields.

In some embodiments, the present disclosure relates to a registration element comprising a top surface, a bottom surface, and a side wall extending therebetween. The registration element can have any suitable shape such as, but not limited to, cylindrical or polygonal. The registration element can comprise additional registration geometry that is, for example, recessed into the top surface, protruding from the top surface, or forming at least a portion of the side wall. The registration element is coupled to a top surface of a die-cut filter web of a filter assembly. The registration element may become temporarily engaged with a filter formation tool that is known in the art, in a manner similar to how a Robertson screwdriver engages with a Robertson screw head.

The filter formation tool comprises a bottom that has a geometry adapted to receive or fit into the corresponding protruding or recessed registration geometry of the registration element. The connection between the filter formation tool and the registration element allows the user to make any desired changes to adjust radial, angular, and/or axial alignment for the filter assembly, thereby preventing it from shifting off-center, spinning, tilting, or otherwise misaligning while the filter assembly is processed into a three-dimensional shape that can conform to the shape of a container using the filter formation tool to produce a beverage capsule.

Alternatively, the registration element could be reversibly coupled to a gripping element of the filter formation tool whereby the gripping elements would reversibly attach to a surface of the registration element. In aspects, the gripping elements attach to any one or more of a top surface and a periphery sidewall of the registration element.

In some embodiments, the present disclosure also relates to a beverage capsule comprising: (a) a container comprising a rim that circumscribes an opening, a base, and a sidewall that extends between the base and the rim; (b) a filter element received into the container, the filter element comprising an edge that circumscribes an opening, a pierceable base, and a sidewall extending therebetween, the sidewall of the filtering element being coupled to one or more locations on the sidewall of the container, the filtering element separating a first and second chamber within the beverage capsule; (c) a lid sealing the opening of the container; and (d) a filter registration element comprising: (i) a pierceable top surface; (ii) a bottom surface; (iii) a cylindrical or polygonal sidewall extending therebetween; (iv) and indeterminate, radially symmetrical registration geometry either recessed into the top surface, protruding from the top surface, or constituting the sidewall. A dry particulate beverage ingredient may be disposed within the first chamber of the beverage capsule.

In some embodiments, the present disclosure also relates to a registration element that is coupled to one or more layered die-cut filter webs, the one or more layered die-cut filter webs forming the filter element, such that the registration element acts as a solid substrate to which the filter webs of the filter element are bonded to. The bond is achieved, for example, ultrasonically, thermally, chemically, mechanically, or otherwise. The registration element is shaped in a way that allows it to become temporarily coupled with any number of tools for manipulation of the multi-layer filter assembly. During manipulation or movement of the multi-layer filter assembly, the filter webs are protected from becoming misaligned or completely separated.

In some embodiments, the present disclosure also relates to a method of manufacturing a registration element. A volume of granular raw material such as, but not limited to, polylactic acid, polyethylene, or polypropylene is disposed in the shape of a pre determined geometric arrangement such as, but not limited to, a disc, a circle, a crescent, an oval, a polygon (e.g. a triangle, square, rectangle, pentagon, hexagon, heptagon, octagon, nonagon decagon, and the like), a star, a gear-shape, and the like, on the filter web of the filter element. The volume of granular raw material is welded to the filter web of the filter element by techniques such as, but not limited to, ultrasonic, thermal, or chemical welding, such that the volume of granular raw material amalgamate and form a porous but rigid registration element adapted to provide alignment of the filter assembly as it is formed into the container.

In some embodiments, the present disclosure also relates to a beverage capsule adapted for single-serve use, the beverage capsule comprising: (a) a container comprising a base, a rim circumscribing an opening, and a sidewall extending between the base and the rim, the container defining an interior volume therein; and (b) a filter assembly at least partially disposed in the interior volume of the container. The filter assembly comprises: (i) a filter element comprising a first surface and a second surface that is opposite the first surface; and (ii) a registration element coupled to the first surface of the filter element, the registration element adapted for fitting and aligning the filter assembly into the container. The filter assembly divides the interior volume into a first chamber and a second chamber; the first chamber occupies a first volume of the interior volume defined by at least the first surface of the filter element and the opening of the container; and the second chamber occupies a second volume of the interior volume defined by at least the second surface of the filter element, the base of the container, and the sidewall of the container. The registration element has a shape or features that is/are complementary to a filter formation tool, the filter formation tool for use in fitting and aligning the filter assembly within the container.

In some embodiments, the present disclosure also relates to a method of manufacturing a filter assembly, the method comprising: (a) providing a filter element made at least in part of web fibres, the filter element comprising a first surface and a second surface that is opposite the first surface; (b) disposing a registration element on the first surface on the filter element; (c) coupling the registration element to the filter element.

In some embodiments, the present disclosure also relates to a beverage capsule for use in a brewed beverage machine including a piercing element, the capsule comprising: a container defining an interior volume including a base configured for being perforated upon contact with a piercing element; a filter assembly disposed in the interior volume and dividing the interior volume into a first chamber for receiving beverage ingredients and a brewing medium and a second chamber, the assembly comprising: a filter element; and a registration element having a top surface and a bottom surface opposed to the top surface, the registration element disposed above the filter element and configured for disposing the filter assembly into the container, wherein the filter element separates the registration element from the second chamber and is arranged to be contacted by the piercing element, and wherein a brewed beverage is formed when the brewing medium is directed into the first chamber containing the beverage ingredients, the brewed beverage is filtered through the filter assembly and then flows into the second chamber and exits the container through the base perforated upon contact with the piercing element.

In one aspect, the bottom surface defines one or more pockets, wherein upon contact of the bottom surface with the piercing element from below, the bottom surface directs the piercing element to pierce the filter element and then enter into the one or more pockets. In another aspect, the bottom surface comprises one or more supports downwardly extending from the bottom surface and defining one or more pockets, the one or more supports are configured, upon contact with the piercing element, to direct the piercing element to pierce the filter element and then enter into the one or more pockets.

In one aspect, the one or more supports comprise a pointed tip for contacting and securing the registration element to the filter element.

In one aspect, the beverage capsule further comprising a pierceable membrane disposed over the one or more pockets to sealingly retain contents within the one or more pockets.

In one aspect, the top surface and/or a sidewall connecting the top surface to the bottom surface is configured for releasable engagement with a filter formation tool for disposing the filter assembly into the interior volume.

In one aspect, the top surface and/or the sidewall comprises one or more alignment features configured to releasably engage with one or more alignment features on the filter formation tool. In one aspect, the sidewall is an internal sidewall that defines an aperture therethrough. In one aspect, the sidewall is a peripheral sidewall. In one aspect, the one or more alignment features are one or more of indentations, protrusions, and/or apertures are configured to permit a desired alignment of the registration element to the filter element before the registration element is secured to the filter element and/or a desired alignment of the registration element within the container after the registration element is secured to the filter element. In one aspect, the desired alignment is one or more of shifting upwards or downwards, shifting lateral, spinning about a central longitudinal axis, and tilting.

In one aspect, the registration element defines one or more channels dimensioned to allow the brewed beverage to flow therethrough.

In one aspect, the registration element is secured to the filter element by ultrasonic, thermal, or chemical weld.

In one aspect, the filter element comprises web fibres. In one aspect, the web fibres form an integral structure with at least a portion of the registration element.

In one aspect, the container further comprises an indentation at the base that extends upwardly towards the interior volume, the indentation providing a depth limit to which the filter assembly can be disposed into the container.

In one aspect, the container further comprises a rim circumscribing an opening and a container sidewall extending between the base and the rim.

In one aspect, the container sidewall comprises a ledge for supporting the filter assembly. In one aspect, the beverage capsule is biodegradable and/or compostable. In one aspect, the registration element comprises a polymeric material. In one aspect, the registration element comprises one or more of polylactic acid, INGEO™ material, and poly-L-lactide.

In some embodiments, the present disclosure also relates to a method of manufacturing a beverage capsule for use in a brewed beverage machine, the method comprising: coupling a registration element to a filter formation tool; contacting a bottom surface of the registration element to a first surface of a filter element comprising web fibres to form a filter assembly; disposing, using the filter formation tool, the filter assembly into a container defining an interior volume such that the filter element divides the interior volume into a first chamber for receiving beverage ingredients and a brewing medium and second chamber; securing a second surface of the filter element to the container; uncoupling the filter formation tool from the registration element.

In one aspect, the disposing comprises adjusting the alignment of the filter assembly within the container.

In one aspect, the adjusting the alignment is one or more of shifting upwards or downwards, shifting lateral, spinning about a central longitudinal axis, and tilting.

In one aspect, the coupling the registration element comprises engagement with the top surface and/or a sidewall connecting the top surface to the bottom surface of the registration element.

In one aspect, the top surface and/or the sidewall comprises one or more alignment features configured to releasably engage with one or more alignment features on the filter formation tool.

In one aspect, the sidewall is an internal sidewall that defines an aperture therethrough. In one aspect, the sidewall is a peripheral sidewall.

In one aspect, the one or more alignment features are one or more of indentations, protrusions, and/or apertures are configured to permit a desired alignment of the registration element to the filter element before the registration element is coupled to the filter element and/or a desired alignment of the registration element within the container after the registration element is coupled to the filter element.

In one aspect, the contacting of the registration element to the first surface of the filter element is by ultrasonic welding.

In one aspect, the bottom surface defines one or more pockets. In one aspect, the bottom surface comprises one or more supports downwardly extending from the bottom surface, and defining one or more pockets.

In one aspect, the method further comprising dispensing a dosing ingredient into the one or more pockets and sealing the one or more pockets with a membrane. In one aspect, the membrane comprises a PLA laminate.

In one aspect, the dosing ingredient is an ingredient that would be desirable to maintain separation from the beverage ingredients before a process of brewing. In one aspect, the dosing ingredient is one or more of dairy, dairy substitutes, flavourings, concentrates, plant extracts, nutrients, vitamins, cannabinoids (CBD), and drugs. In one aspect, the dosing ingredient is a powder, liquid, or gel.

In some embodiments, the present disclosure also relates to a method of manufacturing a filter assembly for use in making a beverage capsule for a brewed beverage machine, the method comprising: providing a filter element made at least in part of web fibres, the filter element comprising a first surface and a second surface that is opposite the first surface; disposing a
registration element on the first surface of the filter element; and coupling the registration element to the filter element, wherein when the filter assembly is disposed into a container to form a beverage capsule that is inserted into a brewed beverage machine, the filter element is arranged to be contacted by a piercing element of the brewed beverage machine.

In one aspect, the method of manufacturing a filter assembly further comprising cutting the filter element around the centre and a radial distance away from the registration element such that the filter element may be folded around the registration element and into a shape defining a filter element sidewall and suitable for containing beverage ingredients.

In one aspect, the registration element comprises a top surface, a bottom surface opposed the top surface, a sidewall connecting the top surface to the bottom surface, wherein the coupling the registration element comprises engagement with the top surface and/or the sidewall.

In one aspect, the top surface and/or the sidewall is configured for releasable engagement with a filter formation tool for disposing the filter assembly into the interior volume.

In one aspect, the top surface and/or sidewall comprises one or more alignment features configured to releasably engage with one or more alignment features on the filter formation tool.

In one aspect, the one or more alignment features are one or more of indentations, protrusions, and/or apertures configured to permit a desired alignment of the registration element to the filter element before the registration element is coupled to the filter element and/or a desired alignment of the registration element within the container after the registration element is coupled to the filter element.

The method of manufacturing a filter assembly of claim 42 wherein the desired alignment is one or more of shifting upwards or downwards, shifting lateral, spinning about a central longitudinal axis, and tilting.

In one aspect, the registration element defines one or more channels dimensioned to allow a brewed beverage to flow therethrough.

In one aspect, the bottom surface defines one or more pockets.

In one aspect, the bottom surface comprises one or more supports downwardly extending from the bottom surface and defining one or more pockets.

In one aspect, the one or more supports comprise a pointed tip for contacting and coupling the registration element to the filter element.

In one aspect, the coupling of the registration element to the filter element is by ultrasonic welding.

In one aspect, the method further comprising dispensing a dosing ingredient into the one or more pockets and sealing the one or more pockets with a membrane. In one aspect, the membrane comprises a PLA laminate. In one aspect, the dosing ingredient is an ingredient that would desirable to maintain separation from the beverage ingredients before a process of brewing. In one aspect, the dosing ingredient is one or more of dairy, dairy substitutes, flavourings, concentrates, plant extracts, nutrients, vitamins, cannabinoids (CBD), and drugs. In one aspect, the dosing ingredient is a powder, liquid, or gel.

BRIEF DESCRIPTION OF THE DRAWINGS

In the accompanying drawings, which illustrate one or more exemplary embodiments:

FIG. 1 is a cross-sectional side view of a beverage capsule according to an embodiment, the capsule comprising a container, a filter assembly disposed in and coupled to the container, the filter assembly comprising a registration element coupled to a top surface of the base of a filter element of the filter assembly, and a lid coupled to the container, the lid for sealing the beverage capsule.

FIG. 2 is an exploded perspective view of the beverage capsule of FIG. 1.

FIG. 3(a) is a perspective view of a first example of a registration element, the registration element being substantially disc-shaped. The outer peripheral side wall of the registration element is adapted to couple to a filter formation tool and for radial, axial, and/or angular alignment of the filter assembly in a container of a beverage capsule.

FIG. 3(b) is a perspective view of a second example of a registration element, the registration element being substantially disc-shaped with an aperture extending therethrough (e.g. washer shaped). The aperture of the registration element is adapted to couple to a filter formation tool and for radial, axial, and/or angular alignment of the filter assembly in a container of a beverage capsule.

FIG. 3(c) is a perspective view of a third example of a registration element, the registration element being substantially disc-shaped and further comprising a cross-shaped indentation that is centered in the registration element. The indentation of the registration element is adapted to couple to a filter formation tool and for radial, axial, and/or angular alignment of the filter assembly in a container of a beverage capsule.

FIG. 3(d) is a perspective view of a fourth example of a registration element, the registration element comprising a multitude of equally-dimensioned teeth that form the outer peripheral side walls of the registration element. The multitude of teeth is adapted to couple to a filter formation tool and for radial, axial, and/or angular alignment of the filter assembly in a container of a beverage capsule.

FIG. 3(e) is a perspective view of a fifth example of a registration element, the registration element being substantially disc-shaped and further comprising a cross-shaped protrusion extending from the top surface of the registration element. The cross-shaped protrusion centered is adapted to couple to a filter formation tool and for radial, axial, and/or angular alignment of the filter assembly in a container of a beverage capsule.

FIG. 4 is a top orthographic view of a sixth example of a registration element, the registration element comprising an array of holes circumscribing an aperture extending through the registration element. The array of holes is adapted to allow fluid to pass therethrough.

FIG. 5(a) is a side orthographic sectional view of the filter assembly depicted in FIGS. 1 and 2, prior to formation. The filter assembly comprises a filter element with a registration element coupled to the filter element. As contemplated in this embodiment, the filter element comprises a sheet of web.

FIG. 5(b) is a side orthographic sectional view of another embodiment of the filter assembly. The filter assembly herein comprises a filter element with a registration element coupled to the filter element. As contemplated in this embodiment, the filter element comprises two sheets of web, wherein the two sheets of webs are affixed to the registration element.

FIG. 6 is a top orthographic view of the filter assembly of FIG. 5(a) or 5(b).

FIG. 8 is a magnified side orthographic sectional view of the rim of the beverage capsule of FIG. 1, depicting a filter assembly/container coupling location and excess filter web protruding beyond the coupling location.

FIG. 9 is a cross-sectional side view of the beverage capsule of FIG. 1, wherein the base of the container is punctured by a fluid extracting element, and the lid is punctured by a fluid injecting element.

FIG. 11A shows a perspective view; FIG. 11B shows a bottom plan view; FIG. 11C shows a cross sectional view across the line 11-11 in FIG. 11B.

FIGS. 12A-12C show another embodiment of the registration element. FIG. 12A shows a perspective view; FIG. 12B shows a bottom plan view; FIG. 12C shows a cross sectional view across the line 12-12 in FIG. 12B.

FIG. 13A shows a perspective view; FIG. 13B shows a side view; FIG. 13C shows a bottom plan view; FIG. 13D shows a cross sectional view across the line 13-13 in FIG. 13C.

FIG. 14A shows the beverage capsule placed above the brewed beverage machine; FIG. 14B shows the contact and piercing of filter element and entry of the piercing element into the pocket of the registration element of the filter assembly.

FIG. 15A shows a perspective view; FIG. 15B shows a bottom plan view; FIG. 15C shows a cross sectional view across the line 15-15 in FIG. 15B; FIG. 15D shows a perspective view of the registration element in engagement with a filter formation tool shown in partial transparency.

FIG. 16A shows a perspective view; FIG. 16B shows a bottom plan view; FIG. 16C shows a cross sectional view across the line 16-16 in FIG. 16B; FIG. 16D shows a perspective view of the registration element in engagement with a filter formation tool shown in partial transparency.

DETAILED DESCRIPTION

Figure 7A:
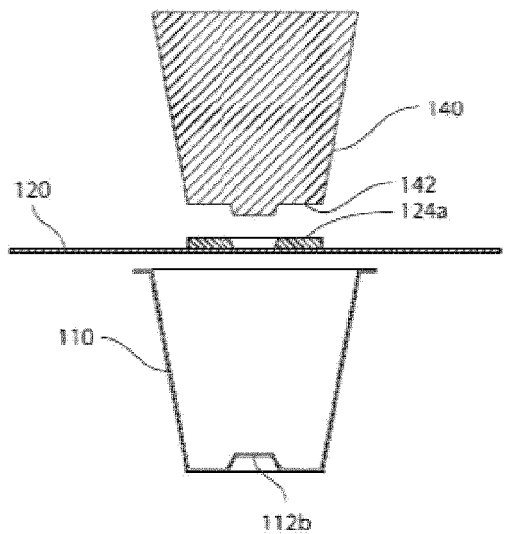
FIG. 7(a) is a cross-sectional side view of a filter formation tool, a filter assembly prior to formation, and a container, wherein the bottom of the filter formation tool is positioned to interface with the top surface and aperture of the registration element.
Figure 7B:
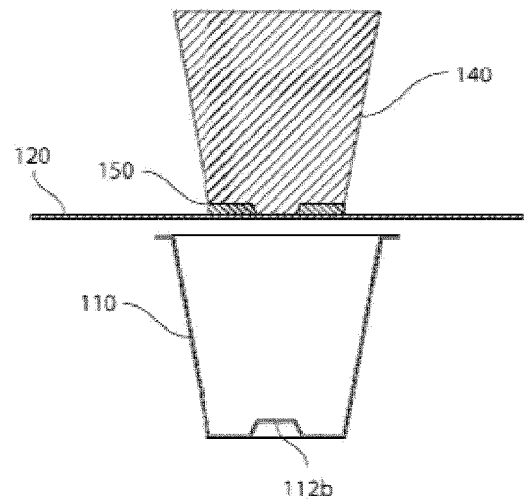
FIG. 7(b) is a cross-sectional side view of the filter formation tool of FIG. 7(a), the filter assembly of FIG. 7(a), and the container of FIG. 7(a), wherein the bottom of the filter formation tool is interfaced with the top surface and aperture of the registration element.

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment. The use of the word "a" or "an" when used herein in conjunction with the term "comprising" may mean "one," but it is also consistent with the meaning of "one or more," "at least one" and "one or more than one". Any element expressed in the singular form also encompasses its plural form. Any element expressed in the plural form also encompasses its singular form. The term "plurality" as used herein means more than one, for example, two or more, three or more, four or more, and the like.

As used herein, the terms "comprising," "having," "including" and "containing," and grammatical variations thereof, are inclusive or open-ended and do not exclude additional, un-recited elements and/or method steps. The term "consisting essentially of" when used herein in connection with a composition, use, or method, denotes that additional elements, method steps or both additional elements and method steps may be present, but that these additions do not materially affect the manner in which the recited composition, method or use functions. The term "consisting of" when used herein in connection with a composition, use, or method, excludes the presence of additional elements and/or method steps.

Beverage Capsule

The present disclosure relates to a beverage capsule and a method of manufacturing thereof. The present disclosure is also related to a filter assembly of the single-serve beverage capsule and a method of disposing the filter assembly within the single-serve beverage capsule. Referring to FIGS. 1 and 2, and according to an embodiment of the disclosure, there is shown a side cross-sectional view and an exploded perspective view, respectively, of a beverage capsule 100. The beverage capsule 100 is adapted for use in a beverage making machine, and can have disposed within it dry beverage ingredients 50 such as, but not limited to, coffee grind, tea leaves, milk powder, chocolate powder, or other partially or fully soluble or extractable dry beverage ingredients 50.

The beverage capsule 100 comprises: (i) a container 110 that defines an interior volume; and (ii) a filter assembly 120 at least a portion of which is disposed in the interior volume of the container 110. When the filter assembly 120 is disposed into the container 110, the filter assembly 120 divides the interior volume into a first chamber 110a and a second chamber 110b. However, in other embodiments, the interior volume of the container 110 may be divided into more than two discrete chambers or sub-chambers. For example, first chamber 110a may be further sub-divided into two or more sub-chambers, each sub-chamber adapted to contain a dry beverage ingredient 50 or other material.

The container 110 comprises a base 112, a rim 114 circumscribing an opening 116, and a sidewall 118 extending between the base 112 and the rim 114. The base 112 comprises a surface portion 112a that circumscribes an indentation 112b. Surface 112a is preferably flat. However, in other embodiments, the surface 112a may be uneven or may have a combination of flat portions and uneven portions. The indentation 112*b* extends inwardly towards the interior volume of the container 110 and encroaches into the second chamber 110*b*.

As described in greater detail below, the indentation 112*b* is a structural feature forming a part of the base 112 of the container 110. The indentation 112*b* may extend the entire length (e.g. diameter) or over a portion of the length of the base 112. As contemplated in this illustrative embodiment, the indentation 112*b* occupies an area that is within and smaller than the area occupied by the base 112.

As described in greater detail below, the indentation 112*b* can act as a depth marker for use in determining or setting a depth to which the filter assembly 120 may be delivered into the container 110. For example, the filter assembly 120 can be delivered into the container 110 to a depth where at least a surface of the filter assembly 120 (e.g. an area of base 122*a* of the filter assembly 120) becomes contiguous with the indentation 112*b*. Depending on how far a manufacturer desires the filter assembly 120 to extend into the container 110, the height of the indentation 112*b* (i.e. the distance that the indentation 112*b* extends into the interior volume of the container 110) can be varied during the manufacturing process of the container 110. Depending on its manufactured height, the indentation 112*b* can also be adapted to decrease the likelihood of a filter formation tool (e.g. die 140) interference or friction fitting into the capsule 100 during filter assembly 120 formation. The indentation 112*b* can also act as a support for the filter assembly 120 during dosing of dry beverage ingredients and during tamping of the dry beverage ingredients the filter assembly 120 within the container 110.

As depicted in this illustrative embodiment, indentation 112*b* is frusto-conical in shape and centred in the base 112 of container 110. However, in other embodiments, the indentation can have any suitable shape such as a cone, a cylinder, a polygonal prism, and the like, and/or can be off-centred. In other embodiments, the container 110 can contain a plurality of indentations. In other embodiments, the container 110 can contain one or more indentations disposed in the side wall 118 and extending into the interior volume of the container 110.

In other embodiments, the container does not contain any indentations forming a part of the base. For example, and referring to FIG. 10 (*a*), beverage capsule 200 comprises a container 210 comprising a base 212, a sidewall 218, a filter assembly 220, and a lid 230 coupled to the container 210.

Figure 10A:
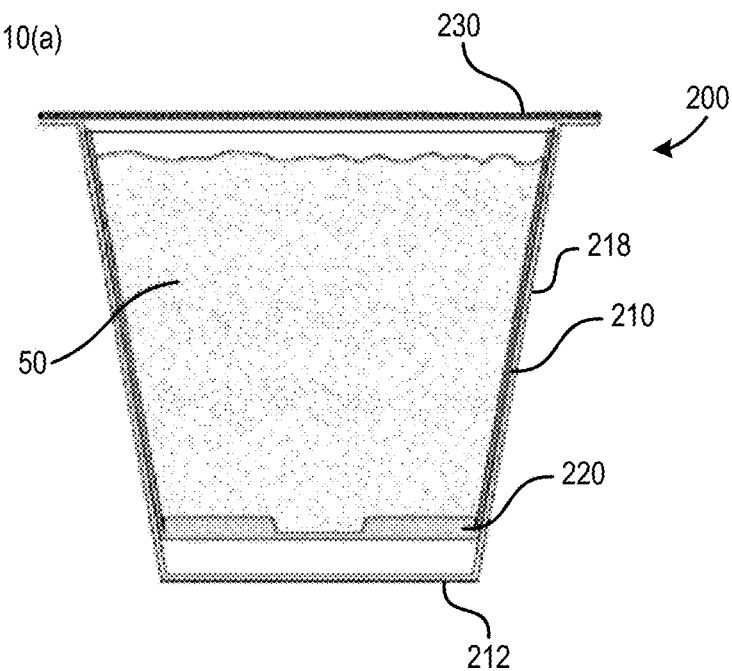
FIG. 10(a) is a cross-sectional side view of a beverage capsule according to a second embodiment, the capsule comprising a container, a filter assembly disposed in and coupled to the container, the filter assembly comprising a registration element coupled to a top surface of the base of a filter element of the filter assembly, and a lid coupled to the container, the lid for sealing the beverage capsule.
Figure 10B:
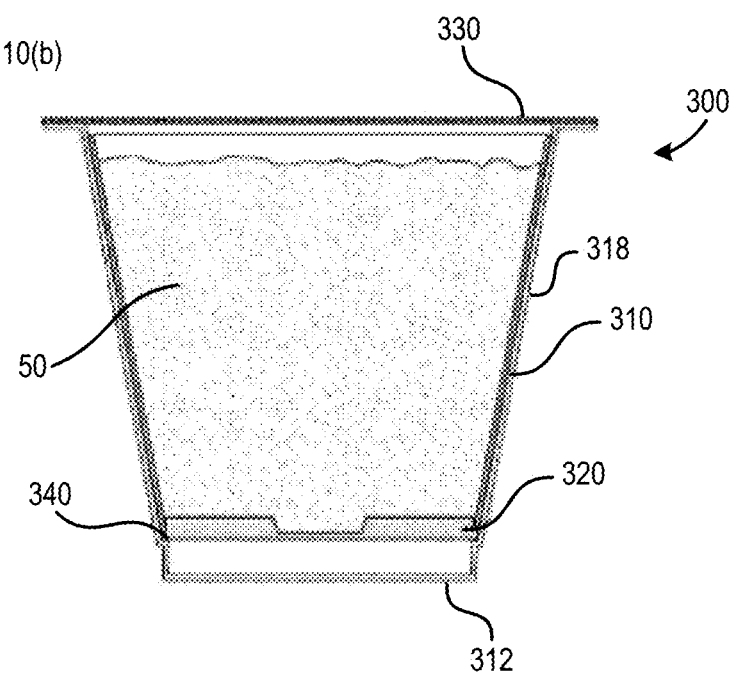
FIG. 10(b) is a cross-sectional side view of a beverage capsule according to a third embodiment, the capsule comprising a container, a filter assembly disposed in and coupled to the container, the filter assembly comprising a registration element coupled to a top surface of the base of a filter element of the filter assembly, and a lid coupled to the container, the lid for sealing the beverage capsule.

In other embodiments, for example, and referring to FIG. 10(*b*), beverage capsule 300 comprises a container 310 comprising a base 312, a sidewall 318, a filter assembly 320, and a lid 330 coupled to the container 310. In this example of beverage capsule 300, the filter assembly 320 can be seated on a ledge 340 circumscribing the sidewall 318 of the container 310.

Returning to FIGS. 1 and 9, the sidewalls 118 extend between the rim 114 and the base 112 of the container 110, and assist in defining the volume of the interior volume of the container 110. As depicted in this illustrative embodiment, the sidewalls 118 are smoothened. However, in other embodiments, the sidewalls of the container may be fluted, corrugated, or otherwise shaped.

The opening 116 provides an ingress to the interior volume of the container 110. The opening 116 can be closed by a lid 130. As contemplated in this illustrative embodiment, the lid 130 is coupled to the rim 114 of the container 110 by a means known in the art such as, but not limited to, heat-sensitive adhesives and hot melting. However, in other embodiments, the lid 130 is not necessarily coupled to the rim 114 of container 110, and may be coupled to another appropriate location of the container 110. The lid 130 is made of any suitable material known in the art such as, but not limited to, a metallic foil, a polymer laminate material, and a biodegradable and compostable polymeric material such as polylactic acid (e.g. INGEO™ material or poly-L-lactide). Preferably, the lid 130 is water and gas impermeable. Preferably, the lid 130 is biodegradable.

The combination of the container 110 and the lid 130 (when closed over the opening 116 and sealing the interior volume) preferably provides a moisture and gas impermeable barrier between the contents (e.g. dry beverage ingredients 50) disposed within the beverage capsule 100 and the surrounding environment, thereby protecting the contents disposed within the beverage capsule 100 from, for example but not limited to, oxidation, rot, and/or moisture damage.

In this illustrative embodiment, the container 110 has a frustoconical shape. However, in other embodiments, the container may have any other suitable shape such as, but not limited to, a polygonal prism, a conical shape, a domed coup or a sphere. The container 110 is manufactured of any suitable material known in the art. For example, the container 110 may be made of a biodegradable and compostable fibre material such as, but not limited to, polylactic acid (e.g. Ingeo™), bamboo, bagasse, and any combination thereof. Preferably, the container 110 is biodegradable. Preferably, the container 110 is compostable.

The interior surface (not numbered) of the container 110 can be coated with a suitable coating material known in the art such as, but not limited to, a biodegradable and compostable polymeric material (e.g. polylactic acid, Ingeo™, poly-L-lactide, or a combination of biodegradable and compostable materials). Preferably, the coating material is water-impermeable. Preferably, the coating material is biodegradable. Preferably, the coating material is compostable.

The filter assembly 120 separates the first chamber 110*a* from the second chamber 110*b* and also acts a barrier to separate the dry beverage ingredients 50 from the second chamber 110*b*. The filter assembly 120 comprises a filter element 122 and a registration element 124 disposed thereon.

As contemplated in this illustrative embodiment, and referring to FIG. 2, the filter element 122 of the filter assembly 120 is shaped to form a base 122*a*, an edge 122*b*, and a sidewall 122*c* extending therebetween. As contemplated in this illustrative embodiment, and referring to FIG. 2, the sidewalls 122*c* are pleated. However, in other embodiments, the sidewalls 122*c* can be of any other suitable shape such as, but not limited to, fluted, corrugated, or flat.

As contemplated in this illustrative embodiment, and referring to FIGS. 1 and 2, the base 122*a* of the filter element 122 is substantially flat. However, in other embodiments, the base 122*a* can be of any other suitable shape such as, but not limited to, fluted, pleated, corrugated, or have a combination of flat portions and uneven portions.

However, in other embodiments, the filter assembly can further comprise a rim, wherein the sidewall 122*c* of the filter element 122 terminates at the rim.

The filter element 122 has a first surface 123*a* and a second surface 123*b* that is opposite the first surface 123*a*. In a formed beverage capsule, and as described in greater detail below, the first surface 123*a* of the filter element 122 forms a portion of the boundary of the first chamber 110*a*, whereas the second surface 123*b* forms a portion of the boundary of the second chamber 110*b*.

As contemplated in this illustrative embodiment, the filter element 122 is entirely disposed within the interior volume of the container 110, and is coupled to the inner surface of the container 110 by means known in the art such as, but not limited to, a hot melt adhesive, thermal welding, a mechanical interference fit, suitable chemical processes, and ultra-sonication. For example, ultra-sonication can be used to weld the top of the side wall 122c of the filter element 122 to the inner surface of the side wall 118 at a location below the rim 114. Preferably, the top of the side wall 122c of the filter element 122 is ultra-sonically welded to the inner surface of the side wall 118 near the top of the container side wall 118. In other embodiments, the filter element 122 may be partially disposed in the interior volume of the container 110. In some of these other embodiments, portions of the filter element 122, particularly those portions of the filter element 122 that are near the edge 122b, can be formed into a rim, and the formed rim of the filter element can be joined to the lid 130 and/or between the lid 130 and the rim 114. In some other embodiments, portions of the filter element 122, particularly those portions of the filter element 122 that are near the edge 122b are secured to the rim 114 of the container. In some aspects, the filter element 122 is secured to rim 114 that is orthogonal to the side wall 118 of the container 110.

As contemplated in this illustrative embodiment, the filter element 122 is made of one or more spunbond nonwoven PLA filter web sheets, each sheet having a weight preferably between about 30 and about 80 grams per square meter. For example, the nonwoven PLA filter web sheets may also have a weight distribution of any one of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, and 80 g/m2. More preferably, the nonwoven PLA filter web sheets have a weight distribution of 45 g/m2. Spunbond nonwoven PLA filter web sheets can be oriented parallel or perpendicular to one another or any degree therebetween. For example, two spunbond nonwoven PLA filter web sheets forming a filter element can be oriented 0.1°, 5°, 10°, 15°, 20°, 25°, 30°, 35°, 40°, 45°, 50°, 55°, 60°, 65°, 70°, 75°, 80°, 85°, or 90° relative to each other, or any degree therebetween.

Preferably, the filter element 122 has a permeability that allows heated liquid and dissolved solids to permeate through while preventing undissolved granular beverage ingredients 50 from filtering through. In other embodiments, the filter element 122 can be made of a heat sealable filter paper made of a petroleum-based material including, but not limited to, polypropylene, polyethylene, and polyethylene terephthalate. In other embodiments, the filter element 122 can be made of an undrawn nonwoven filter web material. In other embodiments, the filter element 122 can be made of a drawn nonwoven filter web material. In other embodiments, the filter element 122 can be made of a synthetic woven filter web material.

As contemplated in this illustrative embodiment, the filter element 122 has a substantially frusto-conical shape that is commensurate with the shape of the container 110. However, in other embodiments, the filter element 122 can have any suitable shape such as, but not limited to, a cylinder shape, a polygonal prism, a domed shape, and a combination thereof.

The registration element 124 is adapted for coupling to the first surface 123a of the filter element 122, according to one embodiment.

The registration element 124 is made of a suitable material such as, but not limited to metal, a plastic, or a polymeric material derived from polylactic acid, Ingeo™, or poly-L-lactide. Preferably, the registration element 124 is made of a material that is biodegradable and preferably, the material is also compostable and fully plant based.

In a non-limiting example, a registration element made of one or more metals and can be coupled to the filter element 122 by a hot melt adhesive. In another non-limiting example, a thermo-plastic registration element can be ultra-sonicated or thermally welded on the filter element 122 such that the bottom surface of the plastic registration element becomes affixed to the first surface 123a of the filter element 122, or and the web fibres of the filter element 122 become mixed together with portions of the registration element that are melted by thermal energy imparted by ultrasonication or thermal welding, the mixed web fibres and melted portions of the registration element forming an integral structure upon cooling.

The registration element 124 can be a discrete component that is pre-manufactured. For example, the registration element 124 can also be derived from a volume of granular raw material such as, but not limited to, polylactic acid, polyethylene, or polypropylene is disposed in the shape of a pre-determined geometric arrangement such as, but not limited to, a disc, a circle, a crescent, an oval, a polygon (e.g. a triangle, square, rectangle, pentagon, hexagon, heptagon, octagon, nonagon decagon, and the like), a star, a gear-shape, a washer-shape and the like. The granular raw material can then be heat moulded, or formed by another means known in the art, to form the registration element. In other embodiments, the volume of granular raw material can be directly disposed on the filter element 120, and the registration element can be directly formed onto the filter element 120.

According to one embodiment, the registration element 124 provides an otherwise loose filter element 122 with a static reference point from which a variety of mechanical processes can be performed. In a non-limiting example, the registration element 124 provides a structural feature for a mechanical apparatus to "pick and place" the filter assembly 120 (i.e. the mechanical apparatus is able to grasp the filter assembly 120 by the registration element 124), move the filter assembly 120 to a designated location, and release the filter assembly 120 at that designated location. The registration element 124 also provides a static reference point for use in centering filter assembly 120. For example, the registration element 124 can be welded to a static, central location on the filter element 122, so that the filter assembly 120 can be quickly and easily aligned to be concentric with a filter forming tool.

In some embodiments, the registration element 124 allows the manipulation of filter elements 122 made from biodegradable or plant-based materials (e.g. compostable plant polymers such as PHA (polyhydroxyalkanoates) and PLA (polylactic acid)) which may have lower melting point and increase fragility into 3 dimensional geometries with symmetric folds without damaging the filter element 122. In some embodiments, the registration element 124 allows for precise location of the filter assembly 120 to any desired depth within the container 110. In particular, the registration element 124 allows for more precise positioning so that of the filter assembly 120 can be disposed to a position closer to the base 110 which increases the volume available for the loading of dry beverage ingredients 50 into the container 110. In some embodiments, the provision of the registration element 124 allows for more efficient control of the dosing of the dry beverage ingredients 50. For instance, since the registration element 124 will facilitate the positioning of the filter assembly 120 lower into the container 110, for a given amount, there would be a reduced likelihood of spillage of dry beverage ingredients 50 over the rim of the container 110 which will minimize wastage of the dry beverage ingredients 50 and does remove the need to clean the rim of the container 110 after the dosing. Additionally, in some embodiments, the diameter of the registration element 124 will dictate the depth at which the filter assembly 120 will seat in a typical frustoconically shaped container 110 and therefore, provision of the registration element 124 efficiently facilitates the positioning of the filter assembly 120 into the container 110.

In some embodiments, the provision of the registration element 124 will increase the quality of the brewed beverage because the registration element 124 when subjected to the upward movement of the piercing element 12 can function similar to a piston that exerts pressure and compresses the dry beverage ingredients 50 in the first chamber 110a to allow for better extraction during the brewing process (as will be described in detail below).

The registration element 124 comprises a top surface 124a, a bottom surface 124b, and a periphery sidewall 124c extending therebetween.

As contemplated in this illustrative embodiment, and referring to FIG. 2, the registration element 124 is cylindrical, washer-shaped, substantially flat, and has radial symmetry. A symmetric registration element 124 allows for easier placement and positioning of the bottom surface 124b of the registration element 124 on the first surface 123a of the filter element 122. However, in other embodiments, the registration element can be any other suitable shape such as but not limited to polygonal, may have surfaces that are undulating or uneven, and/or may be asymmetric in shape. In other embodiments, the registration element adopts a shape that is substantially complementary to a mold of a filter formation tool (as described later). Non-limiting examples of different suitable shapes of registration elements are depicted in FIGS. 3(a) to 3(e). For example, FIG. 3(a) depicts a non-limiting example registration element 224 that is substantially disc shaped.

The registration elements 124 can comprise additional features. As contemplated in this illustrative embodiment, and referring to FIGS. 2 and 3(b), the registration element 124 further includes an internal sidewall 124e connecting the top surface 124a to the bottom surface 124b, the internal sidewall 124e defining an aperture 124d that extends through the thickness of the registration element 124 and between the top surface 124a and the bottom surface 124b. In some embodiments, the aperture 124d at least provides a reduced surface area of the top surface 124a and the bottom surface 124b, which beneficially reduces the amount of material of registration element 124 required to be coupled to the filter element 122.

Non-limiting examples of features similar to aperture 124d that can increase the compatibility of the filter formation tool to the registration element are depicted in FIGS. 3(c) to 3(e). For example, and as depicted in FIG. 3(c), registration element 324 has a cross-shape aperture 324d that extends through the thickness of the registration element 324. For example, and as depicted in FIG. 3(d), registration element 424 has a jagged edge 424e around the periphery of the registration element 424 and an aperture 424d extending through the thickness of registration element 424. For example, and as depicted in FIG. 3(e), the registration element 524 has a cross-shape protrusion 524d that extends away from the top surface 524a of the registration element 524. In other examples, the registration element can comprise one or more indentations or protrusions that serve as additional features for improving the unique fit between a registration element and a filter formation tool.

The registration element can further comprise one or more channels for permitting the flow of liquid therethrough. As depicted in FIG. 4, and according to another example of a registration element, a plurality of channels 624e extend through the thickness of the registration element 624 and circumscribe aperture 624d. Channels 624e provide additional passageways for a beverage medium to flow towards the filter element 122, during use of the beverage capsule 100 in a beverage making machine.

Figure 11A:
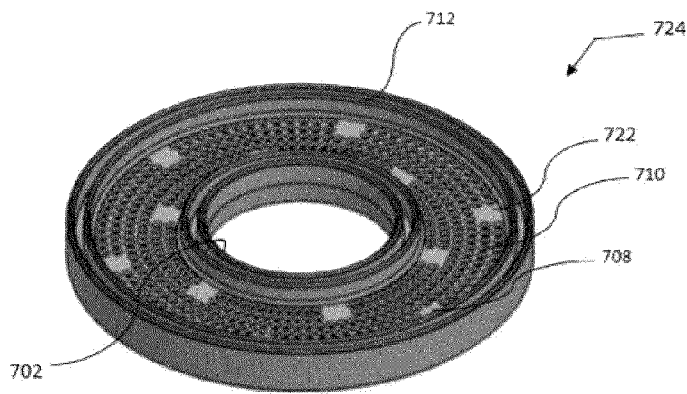
FIGS. 11A-11C show another embodiment of the registration element.
Figure 11B:
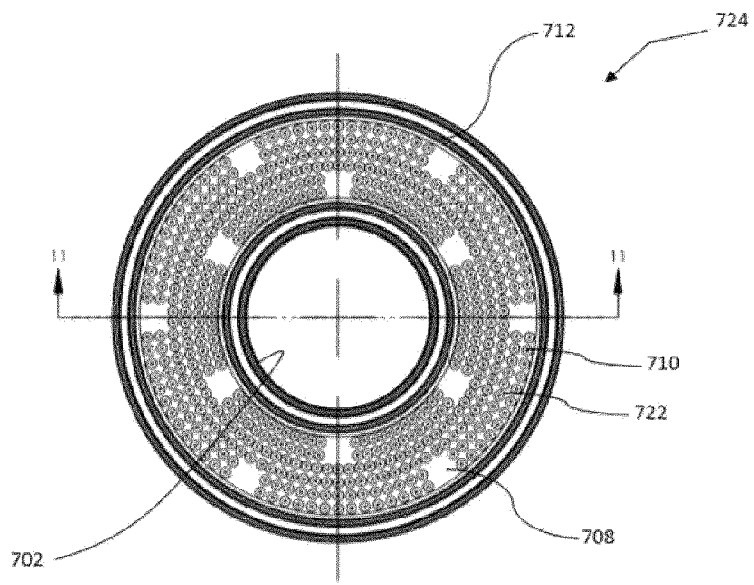
Figure 11C:
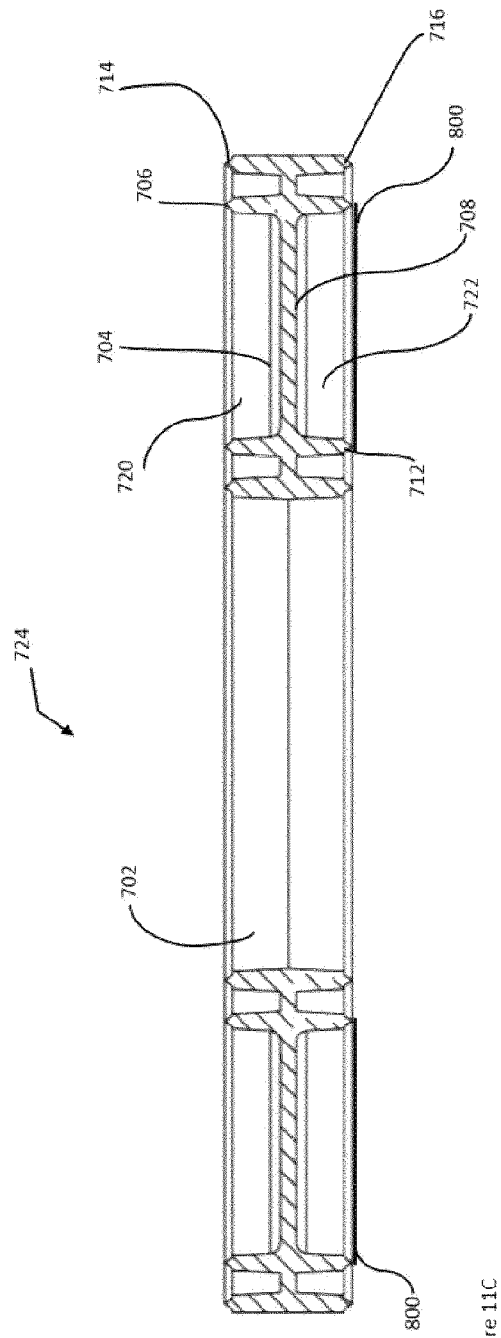

FIGS. 11 to 13 show various embodiments of the registration element. FIGS. 11a to 11c show an annular registration element 724 defining an aperture 702 and having a top surface 704 that includes four annular projections 706 upwardly extending therefrom and a bottom surface 708 opposed to the top surface 704. Registration element 724 also includes a plurality of channels 710 to provide a passageway for the beverage medium to flow through the registration element 724 and towards the filter element 122. The bottom surface 708 includes four annular supports 712 downwardly extending therefrom. The projections 706 and the supports 710 terminate at pointed tips 714 and 716, respectively, for contacting and securing the registration element 724 to the filter element 122.

One or more gaps 720 are defined by the space between projections 706 and collectively these features are configured to form a releasable connection with a filter formation tool 140 (as will be described in detail below).

One or more pockets 722 are formed in the space between the supports 712. The one or more pockets 722 are dimensioned to receive the piercing element from below. With reference to reference to FIG. 14 (a) and 13 (b), the supports 712 are arranged and configured so that when the filter assembly is disposed into the container (shown in FIG. 14 (a)) and then the piercing element is caused to move up from a position below the filter assembly, the piercing element will initially contact the filter element and then upon further upward action, the piercing element will push against the supports 712. The registration element 724 and the supports 712 are configured such that upon further application of force, the piercing element will pierce the filter element and then move into the pocket 722 (shown in FIG. 14 (b)).

Figure 12A:
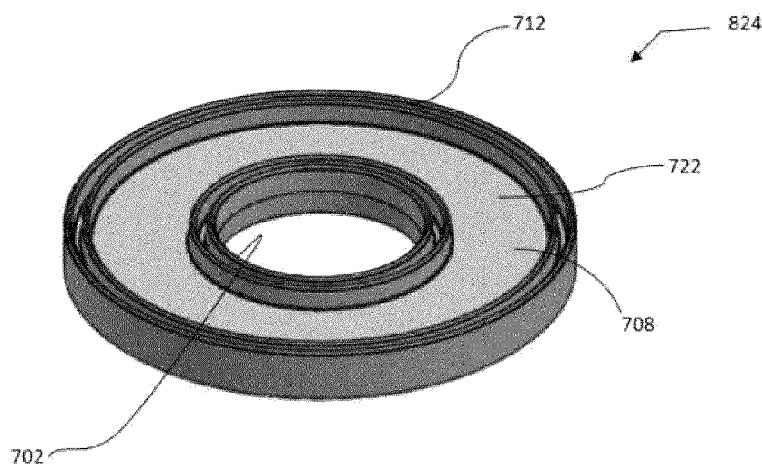
Figure 12B:
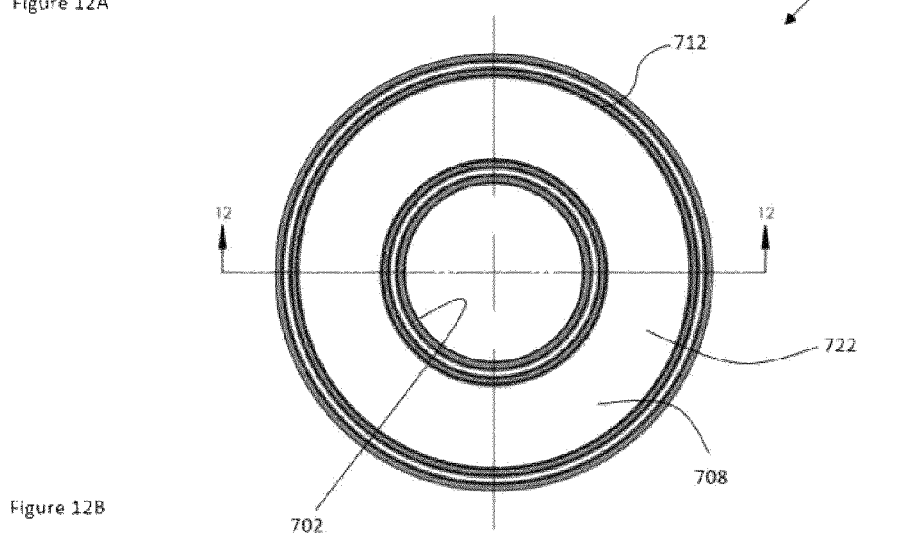
Figure 13A:
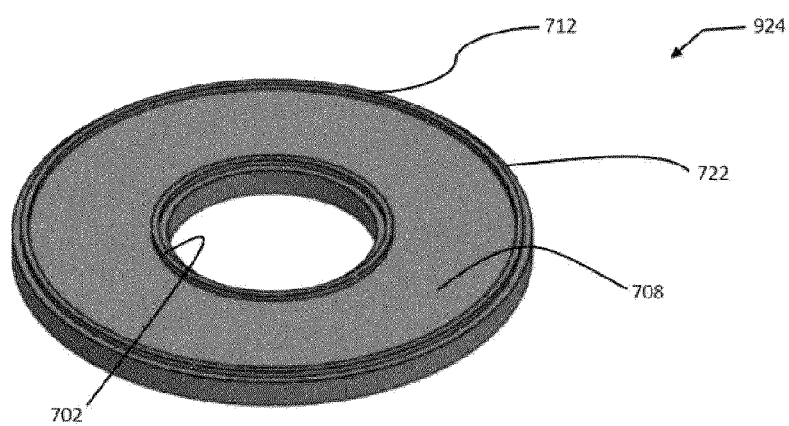
FIGS. 13A-13D show another embodiment of the registration element.
Figure 13B:
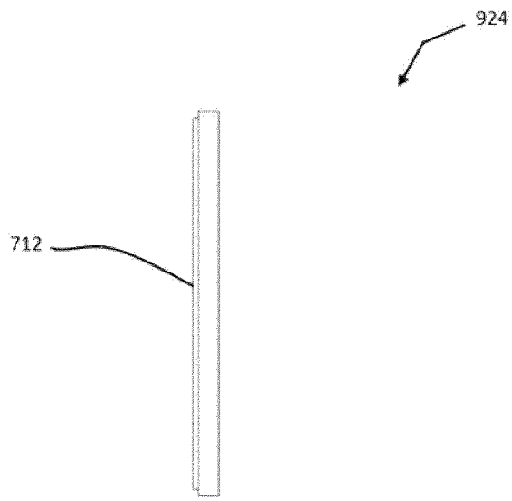
Figure 13C:
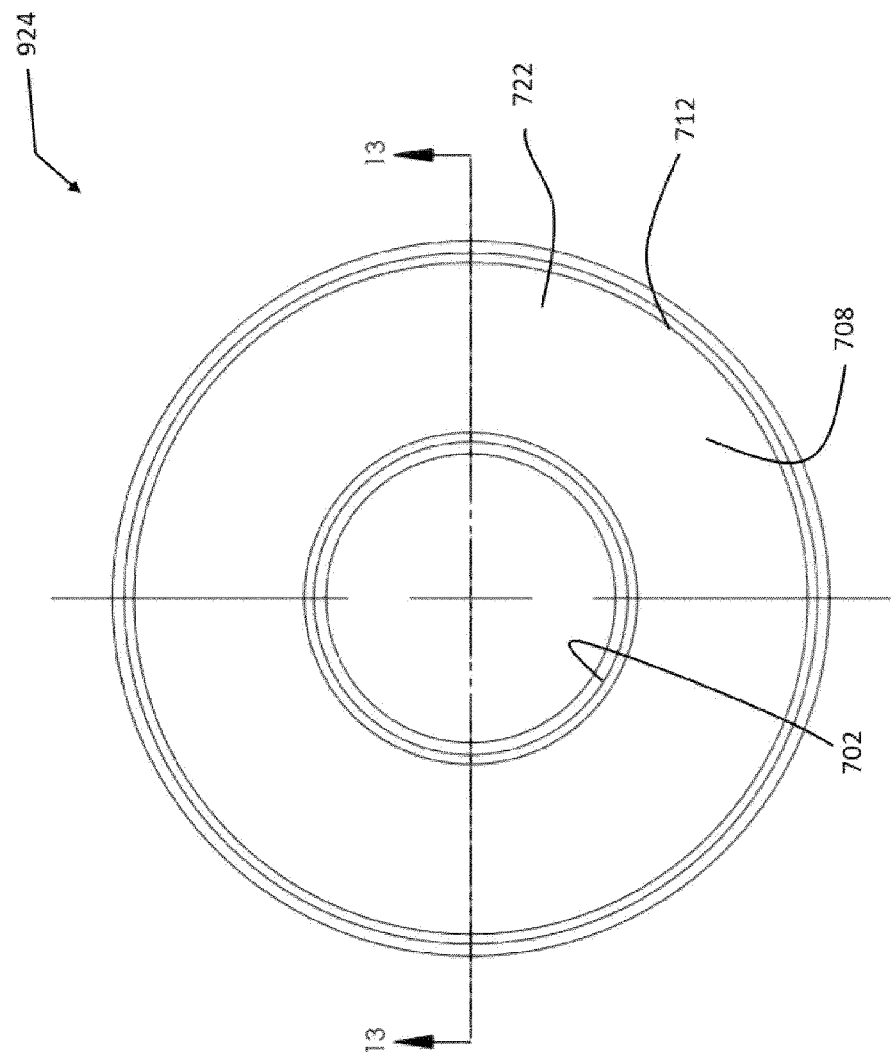
Figure 13D:
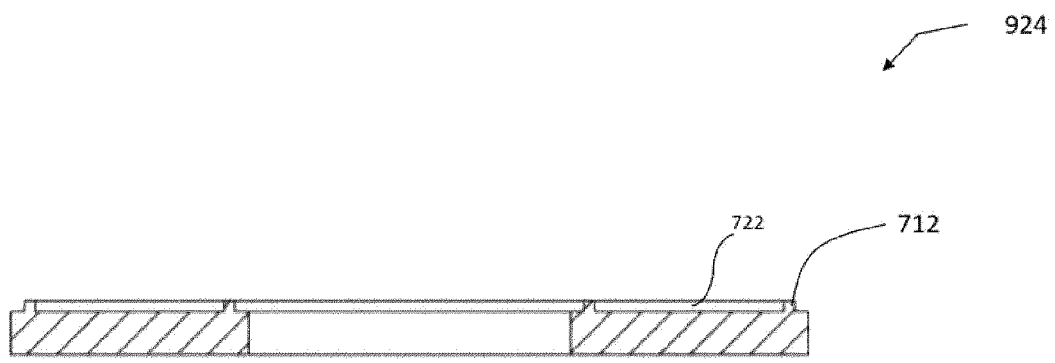

FIGS. 12a to 12c show a solid annular registration element 824 defining an aperture 702 and having a top surface 704 that includes four upwardly extending annular projections 706 and a bottom surface 708 that includes four downwardly extending annular supports 712. One or more pockets 722 are formed in the space between the supports 712.

FIGS. 13a to 13d show a solid annular registration element 924 defining an aperture 702 and having a top surface 704 and a bottom surface 708 that includes four downwardly extending annular supports 712. One or more pockets 722 are formed in the space between the supports 712.

According to one embodiment, the provision of annular projections 706 and annular supports 712 provide some additional height for achieving more efficient processes of automation by improving unscrambling during transport on conveyors and mitigating the shingling effect observed when numerous substantially flat components are forced into an undesirable partially overlapping relationship with each other during the manufacturing process.

Figure 16A:
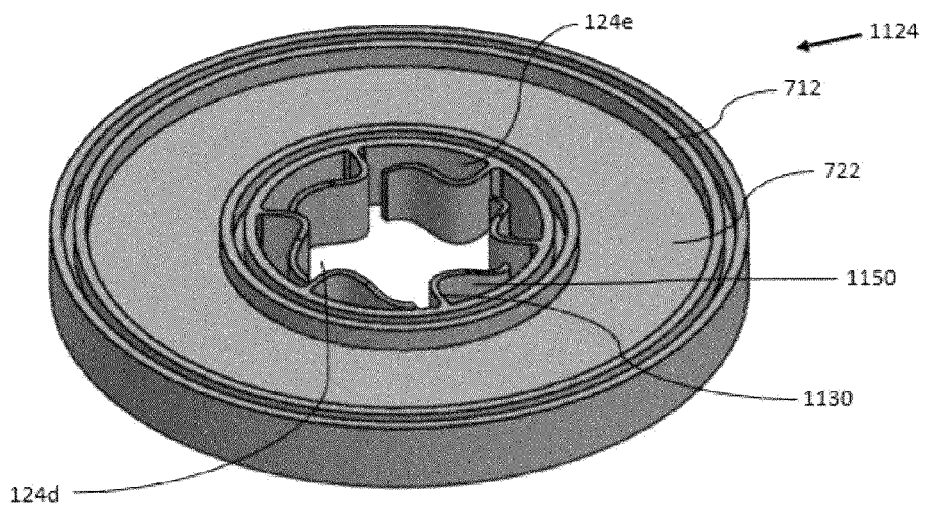
FIGS. 16A-16D show another embodiment of the registration element.
Figure 16B:
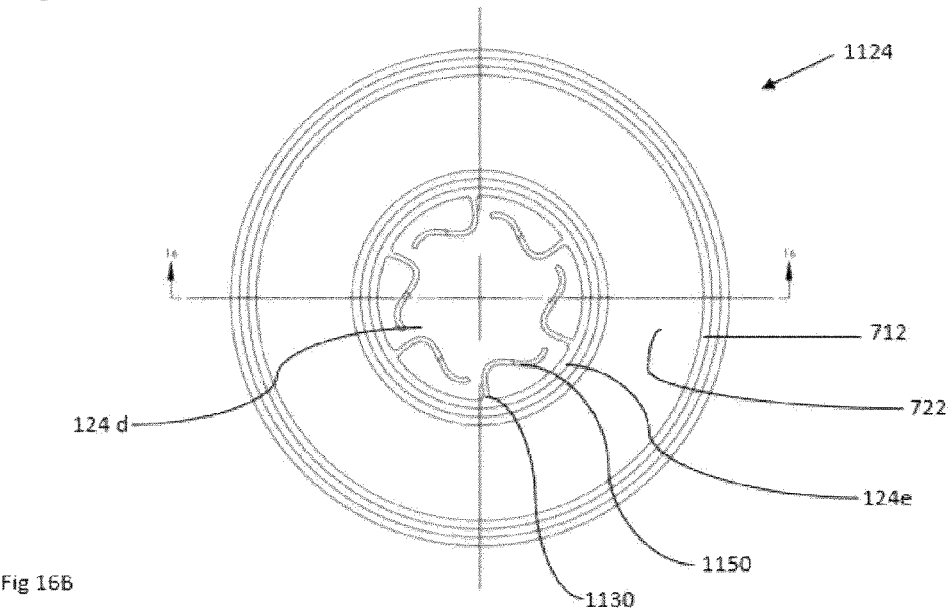
Figures 16C, 16D:
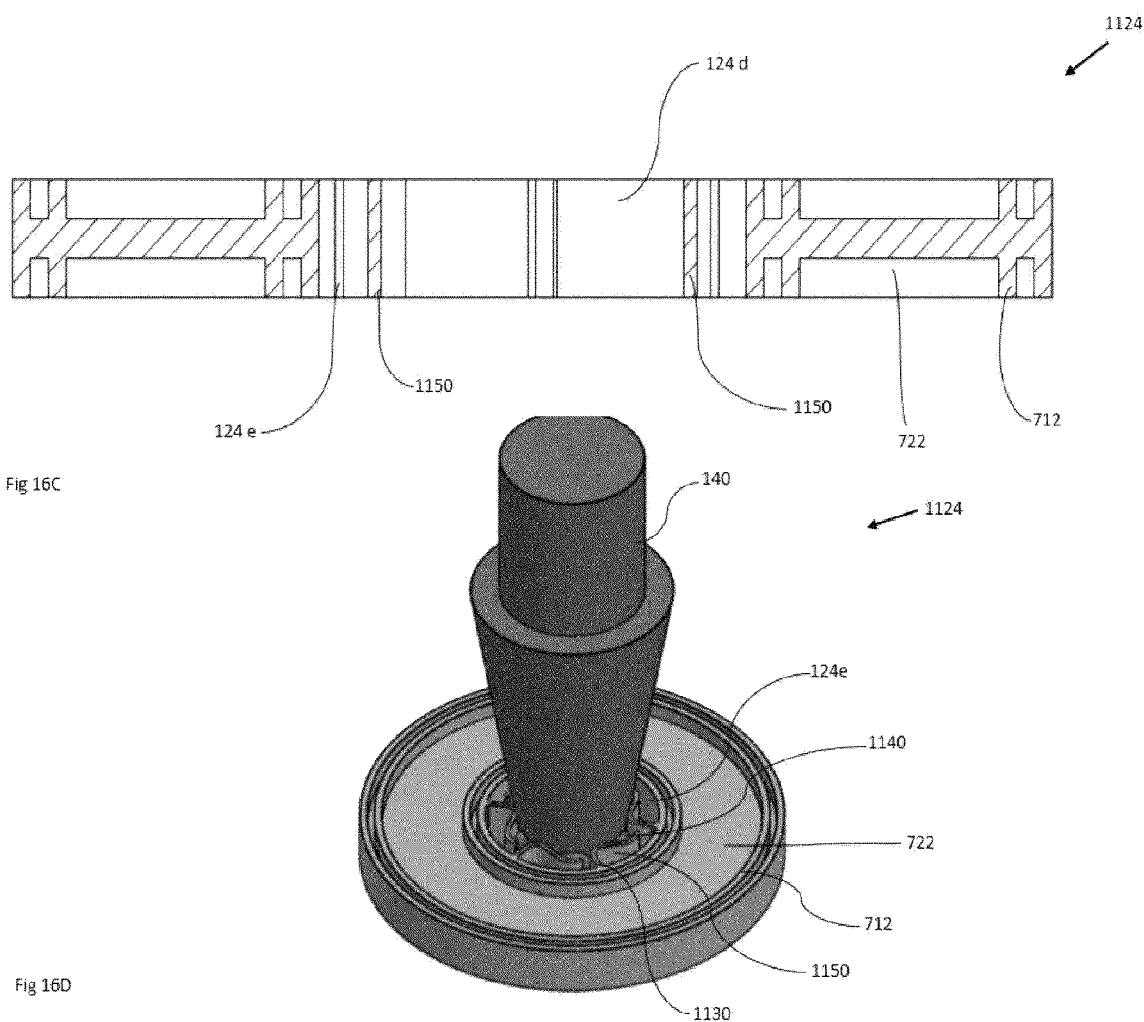

According to one embodiment, and with reference to FIG. 11c, the pocket (s) 722 can additionally serve as one or more dosing chambers useful for retaining one or more dosing ingredients that are subsequently released during the brewing process. The one of more dosing ingredients (not shown) are dispensed into the pocket (s) 722 of an inverted registration element 724 during assembly of a filter assembly 720. Once the desired amount of one or more dosing ingredients are dispensed, the pocket (s) 722 are then sealed using a membrane 800 and the registration element 724 is then secured to the first surface 123*a* of the filter element 722 to form assembly 720. During the brewing process, the dosing ingredients would be released upon puncture of the membrane by the piercing element 12 of the brewing machine. In aspects, the membrane 800 comprises a PLA laminate. Dosing ingredients, include any ingredients for which it would desirable to maintain a separation of the dosing ingredients from the dry beverage ingredients 50 the brewing process is started and until which time it is desirous to mix the dosing ingredients with the dry beverage ingredients. Exemplary ingredients include powders, liquids, or gels, including but are not limited to dairy, dairy substitutes, flavourings, concentrates, plant extracts, nutrients, vitamins, cannabinoids (CBD) such as tetrahydrocannabinol (THC), drugs and etc. . . . , In addition, in some embodiments, the provision of the internal sidewall 124*e* and the aperture 124*d* provides an additional feature that a filter formation tool may be configured to complementary to, and thereby increasing the compatibility of the filter formation tool with the registration element 124. FIGS. 15 and 16 show registration elements 1024 and 1124, respectively, each of which are configured to reversibly engage the filter formation tool 140 and allow the filter formation tool 140 to grip and then manipulate registration elements 1024 or 1124 in any desired alignment, before or after securing the registration elements 1024 or 1124 to the filter element 122 in respect to the container 110 (e.g. in and out, rotation, and/or tilting), so that the formed filter assembly 120 can be inserted and suitably aligned within the container 110.

In particular reference to FIGS. 15*a* to 15*d*, registration element 1024 comprises internal sidewalls 124*e* that defines one or more hemispherical indents 1030 distributed circumferentially around the aperture 124*d*. Each one indent 1030 is configured to reversibly engage a complementary hemispherical protuberance 1040 on the filter formation tool 140 (see FIG. 15*d*). While indents 1030 and protuberances 1040 are shown to have a hemispherical shape, the shape of indents 1030 and protuberances 1040 are not limited to those hemispherical shapes. Indents 1030 and protuberances 1040 can be any form which would permit coupling therebetween and coordinated movement of the registration element 1024 or the filter assembly 120 into the desired alignment within the container 110. Once the registration element 1024 is moved in the desired alignment, it is then decoupled from the filter formation tool 140.

In particular reference to FIGS. 16*a* to 16*d*, registration element 1124 comprises internal sidewalls 124*e*. One or more arms 1130 are distributed circumferentially from the internal sidewalls 124*e* and extend into the aperture 124*d*. Each one arm 1130 includes a cradle 1150 configured to reversibly engage a complementary hemispherical protuberance 1140 on the filter formation tool 140 (see FIG. 16*d*). In some aspects, each one cradle 1150 is flexibly moveable and is configured so as to be able to resiliently retain protuberance 1140 by applying a retaining force to maintain a connection so that the registration element 1024 can be moved in the desired alignment before or after securing the registration element 1124 to the filter element 122 upon which it is desired to uncouple the filter formation tool 140 from registration element 1124.

In some aspects, the configuration of the registration elements 1024 and 1124 result in increased efficiency of construction because these designs removes the need for undercuts typically required during the moulding process.

In some aspects, the configuration of registration elements 1024 and 1124 overcomes various shortcomings arising from the use of certain materials such as PLA (which can be difficult to shoot and anneal (as this is done in mold) and require complicated and expensive mold making and design), which replaces the use of typical petroleum thermoplastics used in present commercial applications.

Construction of Filter Assembly and Placement Thereof into a Beverage Capsule

Referring to FIGS. 5(*a*) and 5(*b*), the filter assembly 120 comprises the filter element 122 and the registration element 124. Filter assemblies can be manufactured in an automated plant such as the one described in U.S. Pat. No. 8,276,639, incorporated herein by reference in its entirety. For example, a sheet of unfurled filter web is laid out. One or more registration elements 124 is disposed on the first surface of the sheet of unfurled web, the bottom surface 124*b* of each registration element 124 being contiguous with the first surface of the unfurled filter web. The registration elements 124 can be disposed onto the unfurled web by shearing them off a precursor rod. In other embodiments, the registration elements 124 are die cut from a flat stock of suitable material (e.g. crystalline polylactic acid) and the formed registration elements 124 are disposed onto the unfurled filter web. In other embodiments, registration elements 124 are formed using an additive manufacturing process (e.g. sterolithographic process) wherein the registration elements 124 are 3-D printed directly onto the filter element 122.

The placement of the one or more registration element 124 on the first surface of the sheet of filter element 122 may not require exact measurement. However, planned placement of the one or more registration element 124 on the sheet of filter element 122 can maximize the number of registration elements 124 that can be disposed on the sheet of filter element 122, thereby optimizing usage of the sheet of filter element 122.

As described above, the method and means by which the registration element 124 can be coupled to the filter element 122 depends on the material of the registration element 124. For example, a registration element made of a suitable metal or metals (e.g. an inert metal that can withstand temperatures of 100° C. or greater) can be coupled to the filter element 122 by a hot melt adhesive. In another example, a registration element made of a material that can be at least partially melted (e.g. a polymeric material derived from polylactic acid, Ingeo™, or poly-L-lactide) can be coupled to the filter element 122 by thermal welding or ultrasonic welding. Furthermore, and depending on the material of the registration element, the registration element can also be coupled to the filter element by other means including, but not limited to, chemical processes, mechanical means (e.g. fasteners), magnetic means, or interference fit.

As contemplated in this illustrative embodiment, the registration element 124 is made of a material (e.g. a poly-lactic acid based material) that is the same as or substantially similar to the material from which the filter element 122 is made, and is coupled to the first surface of the filter element 122 by ultrasonic welding. In some instances of ultrasonic welding, at least a portion of the bottom surface 124*b* (as depicted in FIG. 5(*a*)) becomes affixed to the first surface of the filter element 122 such that the registration element 124 and the filter element 122, while affixed together, appear substantially as separate elements. In other instances of ultrasonic welding, localized melting of the registration element 124 can occur owing to what the inventors hypothesize (though not wishing to be bound by it) is the absorption by the registration element 124 at its bottom surface 124b of vibrational energy from the applied ultrasonic waves. Such localized melting of the registration element 124 allows portions of the web fibres of the filter element 122 directly in contact with the melted portions of the registration element 124 to mix together with the melted portions of the registration element 124 and form an integral structure of mixed filter element 122 web fibre material and registration element 124 material upon cooling and/or cessation of the application of ultrasonic waves to the bottom surface 124b of the registration element 124 (as depicted in FIG. 5(b)).

In other manufacturing methods, the registration element is directly formed onto the filter element 122. For example, a volume of granular raw material such as, but not limited to, polylactic acid, polyethylene, or polypropylene can be disposed in the shape of a pre-determined geometric arrangement such as, but not limited to, a disc, a circle, a crescent, an oval, a polygon (e.g. a triangle, square, rectangle, pentagon, hexagon, heptagon, octagon, nonagon decagon, and the like), a star, a gear-shape, and the like, on the filter web of the filter element 122. The volume of granular raw material can be welded to the filter web of the filter element 122 by techniques such as, but not limited to, ultrasonic, thermal, or chemical welding, such that the volume of granular raw material amalgamates and forms a registration element adapted to provide alignment of the filter assembly 120 during its placement into the container 110.

As contemplated herein, the registration element 124 is positioned on the first surface of the filter element 122 such that when the filter assembly 120 is formed, the registration element 124 covers an area that is equal to or less than the area of the base 122a of the filer element 122.

Once affixed to the filter element 122, the affixed registration element 124 can be used as a reference point to die cut the sheet of filter element 122. For example, the sheet of filter element 122 can be die cut at a consistent radius from the centre of the registration element 124, thereby forming a filter assembly 120 comprising a filter element 122 and the registration element 124 centred on the filter element 122 (as depicted in FIG. 6).

The filter assembly 120 is then disposed within the interior volume of the container 110. Referring to FIGS. 7(a) to 7(d), a filter formation tool is shown as a die 140 having a base 142 that has a shape that is complementary to the shape of the registration element 124 (as depicted in FIG. 2). The die 140 also has an overall shape that is commensurate with the shape of the container 110 (as contemplated herein, frusto-conical). The die 140 contacts the top surface 124a of the registration element 124 and forms an interface 150 with the registration element 124. In other embodiments, another suitable filter formation tool can be used.

The complementary fitting of the registration element 124 and the base 142 of the die 140, leading to the formation of interface 150, provides radial, angular, and/or axial alignment of the filter assembly 120 relative to the die 140. Such alignment minimizes the likelihood of the filter assembly 120, and particularly the filter element 122, shifting, spinning, tilting, or otherwise misaligning during insertion and fitting into the container 110. Features of the registration element such as the non-limiting examples depicted in FIGS. 3(a) to 3(e) and 4 as described above can improve the radial, angular, and/or axial alignment of the filter assembly 120 relative to the die 140.

Figure 7C:
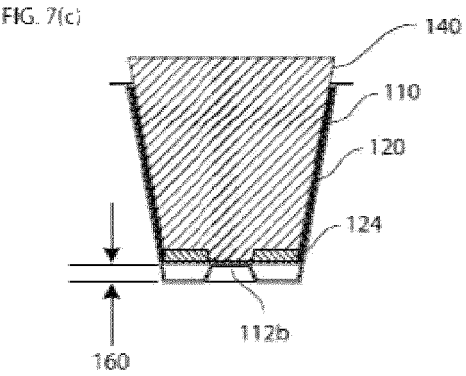
FIG. 7(c) is a cross-sectional side view of the filter formation tool, the filter assembly of FIG. 7(a), and the container of FIG. 7(a), wherein the interfaced filter formation tool and filter assembly are disposed within the container to a depth that is defined by the indentation forming a part of the base of the container.
Figure 7D:
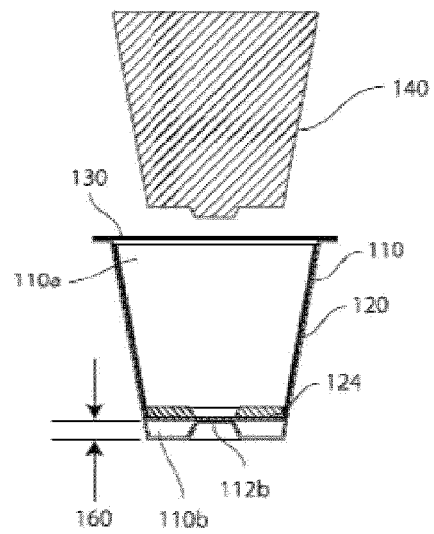
FIG. 7(d) is a cross-sectional side view of a filter formation tool of FIG. 7(a), and the filter assembly of FIG. 7(a) that is formed and disposed within the container of FIG. 7(a), wherein the filter formation tool has been fully extricated from the filter assembly and the container.

Referring to FIGS. 7(c) and 7(d), the filter assembly 120 is disposed into the container 110 under the guidance of the die 140, until the second surface of the filter assembly 120 contacts the top of indentation 112b of the container 110. As described above, the pre-defined depth 160 which the indentation 112b extends into the interior volume of the container 110 determines the depth which the filter assembly 120 can extend into the container 110. After the filter assembly 120 is disposed within the container 110 to the desired depth as pre-defined by the location and height of the indentation 112b, the die 140 is removed from the filter assembly 120.

The partially-formed beverage capsule 100 proceeds to subsequent manufacturing steps including coupling the filter assembly 120 to the container 110, introducing the dry beverage ingredients 50 into the first chamber 110a, tamping the dry beverage ingredients 50 within the first chamber 110a, and sealing the beverage capsule 100 with the lid 130. In other embodiments, the filter assembly 120 can be disposed into the container 110 such that it does not contact the indentation 112b (e.g. the base 122a of the filter assembly 120 is located at a pre-defined distance above the indentation 112b) and is delivered into the container 110 to a pre-determined depth.

The methods of manufacture disclosed herein can provide: (i) a side wall height tolerance as narrow as ±0.005 mm; (ii) a filter element depth tolerance (i.e. the depth that the filter assembly 120 is disposed into the container 110) as narrow as 0.01 mm; and/or (iii) an angular tolerance of the base of the seated filter assembly as narrow as ±0.1 degrees.

Referring to FIG. 8, there is shown a magnified side orthographic sectional view of the rim of the beverage capsule of FIG. 1, depicting a filter assembly/container coupling location and excess filter web 122d protruding beyond the coupling location. In many current beverage capsules, the excess filter web 122d serves as a buffer to take into account any variations in height of the filter element side wall. By providing a tight tolerance to the filter assembly, the present disclosure can at least minimize the need for this excess filter web, thereby providing manufacturing cost savings by reducing the amount of material required to make a filter assembly.

Use of the Beverage Capsule

Referring to FIG. 9, and using the beverage capsule 100 as an illustrative example, the beverage capsule 100 is inserted into a compartment of a brewing machine. The brewing machine is activated. A fluid injector 10 penetrates through the lid 130 and into first chamber 110a, the first chamber 110a containing the dry beverage ingredients 50. The fluid injector 10 does not touch the filter element. A fluid extractor or piercing element 12 also penetrates the container 110 through the base 112 at surface 112a and enters the second chamber 110b. The fluid extractor 12 may or may not contact the portion of the filter assembly 120 where the registration element 124 overlies the filter element 122 or where the web fibres of the filter element 122 are mixed together with at least a portion of the registration element 124 forming an integral structure.

A brewing medium (e.g. hot water) is expelled from the fluid injector and into the first chamber 110a. The brewing medium mixes with the beverage ingredients 50, and flavours from the beverage ingredients are extracted or dissolved into the brewing medium. The brewing medium containing the extracted or dissolved flavours percolates through the filter element 122 and into second chamber 110b. The fluid extractor extracts the brewing medium containing the extracted flavours from second chamber 110b. The brewing medium containing the extracted flavours is then dispensed from the brewing machine as a drink beverage. The used beverage capsule 100 is expelled from the brewing machine.

Figure 14A:
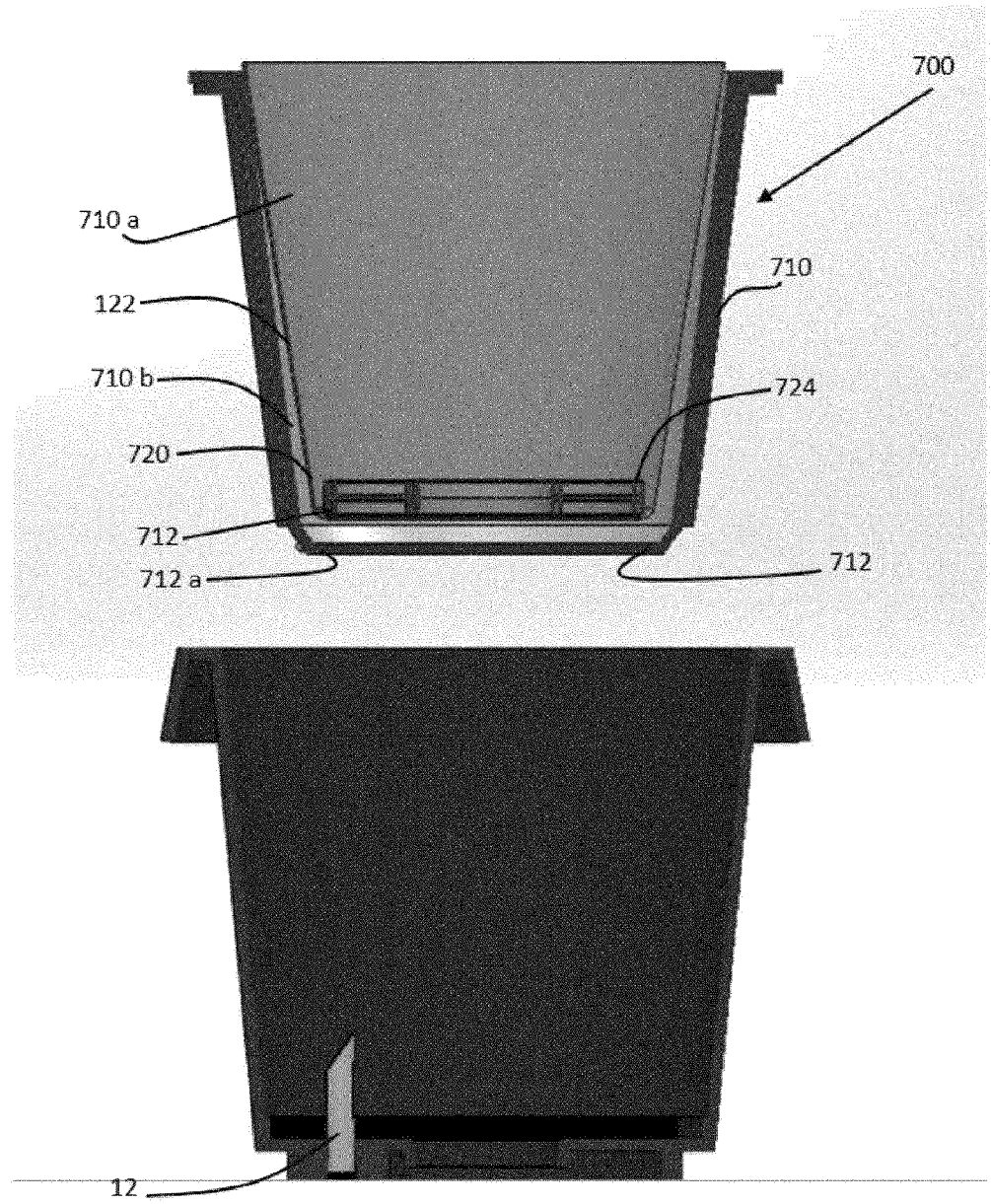
FIGS. 14A and 14B show cross-sectional side views of the beverage capsule and a brewed beverage machine including a piercing element.
Figure 14B:
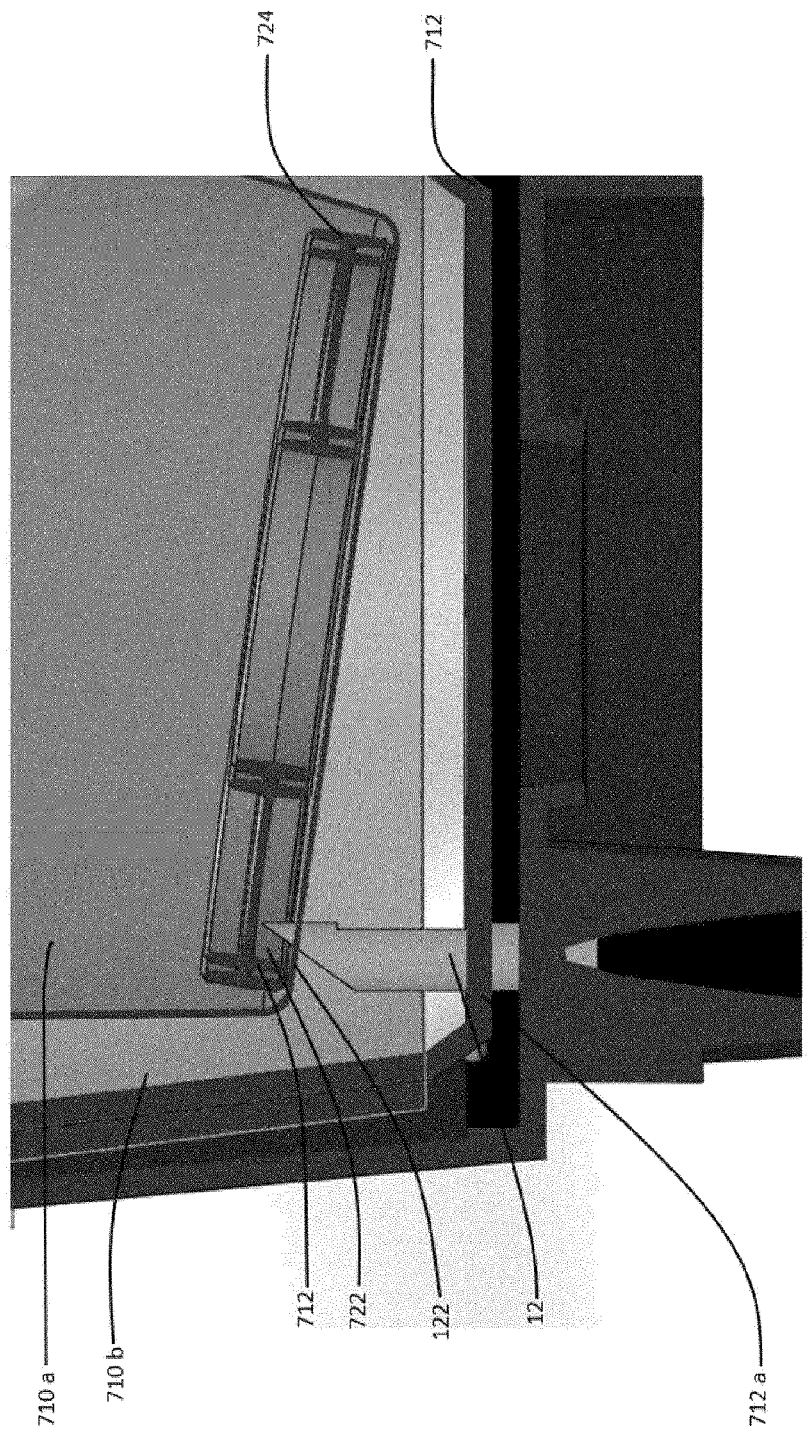
Figure 15A:
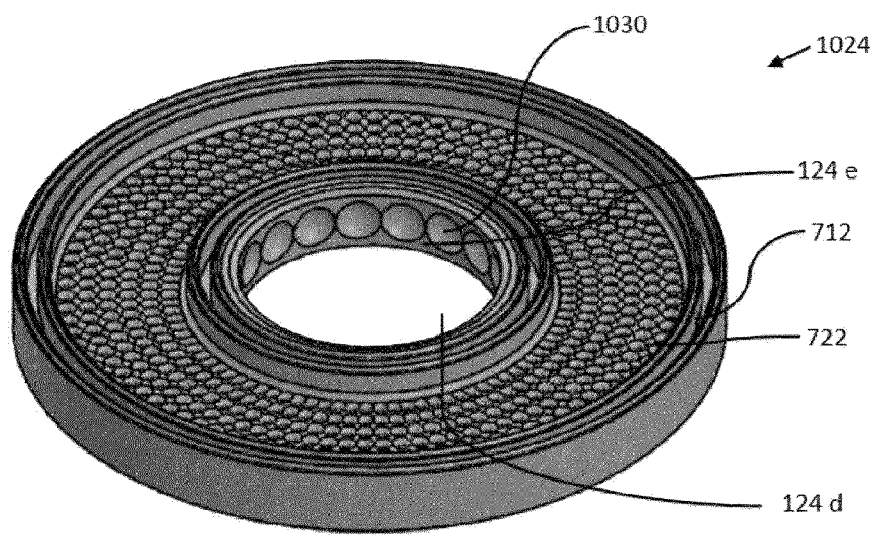
FIGS. 15A-15D show another embodiment of the registration element.
Figure 15B:
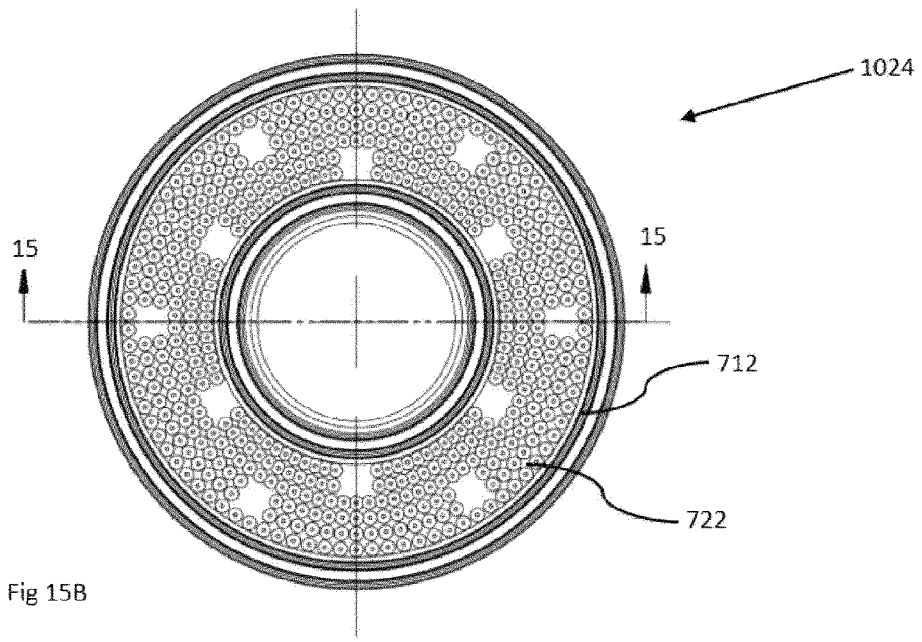
Figure 15C:
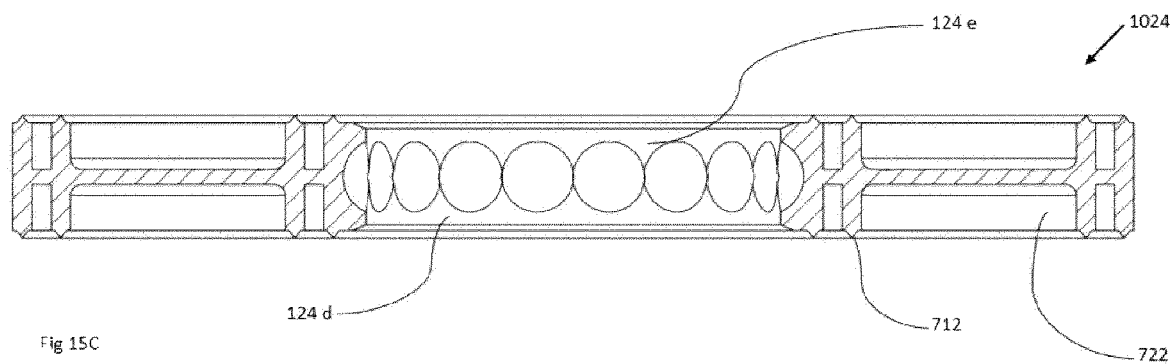
Figure 15D:
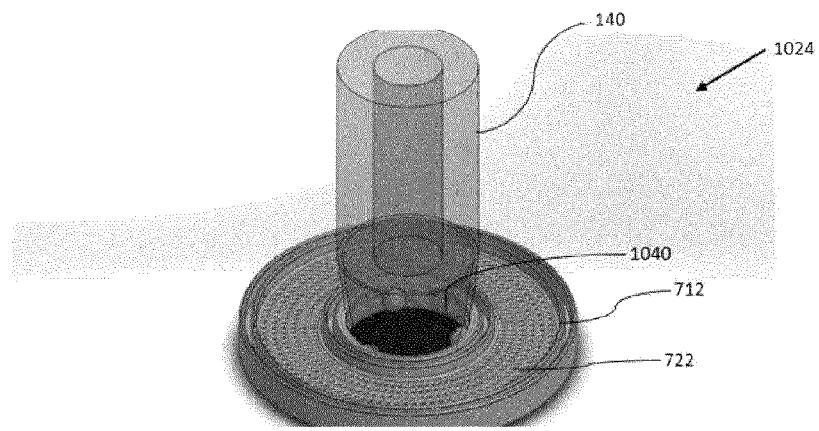

Referring to FIGS. 14(a) and 14(b), a beverage capsule 700 comprising container 710 and filter assembly 720 including filter element 122 and registration element 724, is inserted into a compartment of a brewing machine (not shown) that includes a fluid extractor or piercing element 12. The fluid extractor or piercing element 12 is caused to penetrate the container 710 through base 712 at surface 712a to enter second chamber 710b. Further upward movement of the fluid extractor 12 will cause it to contact the filter element 122 of the filter assembly 720. As shown in the embodiment of in FIG. 14 (b), the arrangement of the registration element 724 is respect of the filter element 122 is such that the fluid extractor 12 would be able to pierce through the filter element 122 and then enter into pocket 722 of the registration element 724. As depicted, depending on the type of brewing machine and orientation of the filter assembly 720, the fluid extractor 12 can be caused to indirectly contact and push against supports 712 which are configured to then direct movement of the fluid extractor 12 into pocket 722. In this respect, the registration element 724 does not protect the filter element 122 from being damaged by contact with the fluid extractor or piercing element 12. On the contrary, the registration element 724 is configured to allow the puncture of the filter element 122 and facilitate the subsequent upwards displacement of at least a portion of the registration element 724.

Similar to the above, a brewing medium (e.g. hot water) (not shown) is expelled into the first chamber 710a and the brewing medium mixes with the beverage ingredients 50, and flavours from the dry beverage ingredients 50 are extracted or dissolved into the brewing medium. The brewing medium containing the extracted or dissolved flavours percolates through the filter element 122 and into second chamber 710b. The fluid extractor 12 extracts the brewing medium containing the extracted flavours from second chamber 710b. The brewing medium containing the extracted flavours is then dispensed from the brewing machine as a drink beverage. The used beverage capsule 700 is expelled from the brewing machine.

It should be understood that aspects of the invention are described herein with reference to the figures, which show illustrative embodiments in accordance with aspects of the invention. The illustrative embodiments described herein are not necessarily intended to show all aspects of the invention, but rather are used to describe a few illustrative embodiments. Thus, aspects of the invention are not intended to be construed narrowly in view of the illustrative embodiments. Wherever possible, the same reference numerals used throughout the drawings refer to the same or like parts.

It should be appreciated, then, that the various concepts and embodiments discussed herein may be implemented in any of numerous ways, as the disclosed concepts and embodiments are not limited to any particular manner of implementation. In addition, it should be understood that aspects of the invention may be used alone or in any suitable combination with other aspects of the invention. In particular, features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole. Any dimensions provided in the drawings are provided for illustrative purposes only and are not intended to be limiting on the scope of the invention. The subject matter described herein and in the recited claims intends to cover and embrace all suitable changes in technology.

What is claimed is:

1. A beverage capsule for use in a brewed beverage machine including a piercing element, the beverage capsule comprising:
   a container defining an interior volume including a base configured for being perforated upon contact with the piercing element;
   a filter assembly disposed in the interior volume and dividing the interior volume into a first chamber containing beverage ingredients and a brewing medium and a second chamber, the filter assembly comprising:
   a filter element comprising web fibers; and
   a registration element having a top surface and a bottom surface opposed to the top surface, wherein the registration element is disposed above the filter element, wherein the bottom surface defines one or more pockets,
   wherein the filter element separates the registration element from the second chamber, such that upon contact of the filter element with the piercing element from below, the filter assembly directs the piercing element to pierce the filter element and then enter into the one or more pockets, and
   wherein a brewed beverage is formed when the brewing medium is directed into the first chamber, the brewed beverage is filtered through the filter assembly and then flows into the second chamber and exits the container through the base perforated upon contact with the piercing element.

2. The beverage capsule as defined in claim 1 wherein the bottom surface comprises one or more supports downwardly extending from the bottom surface and defining the one or more pockets, the one or more supports are configured, upon contact with the piercing element, to direct the piercing element to pierce the filter element and then enter into the one or more pockets.

3. The beverage capsule as defined in claim 2 wherein the one or more supports comprise a pointed tip for contacting and securing the registration element to the filter element.

4. The beverage capsule as defined in claim 1 further comprising a pierceable membrane disposed over the one or more pockets to sealingly retain contents within the one or more pockets.

5. The beverage capsule as defined in claim 1 wherein the top surface of the registration element and/or a sidewall of the registration element connecting the top surface of the registration element to the bottom surface of the registration element is configured for releasable engagement with a filter formation tool for disposing the filter assembly into the interior volume.

6. The beverage capsule as defined in claim 5 wherein the top surface of the registration element and/or the sidewall of the registration element comprises one or more alignment features configured to releasably engage with one or more alignment features on the filter formation tool.

7. The beverage capsule as defined in claim 6 wherein the one or more alignment features are one or more of indentations, protrusions, and/or apertures.

8. The beverage capsule as defined in claim 5 wherein the sidewall of the registration element is an internal sidewall that defines an aperture therethrough.

9. The beverage capsule as defined in claim 5 wherein the sidewall of the registration element is a peripheral sidewall.

10. The beverage capsule as defined in claim 1 wherein the registration element is secured to the filter element by ultrasonic, thermal, or chemical weld.

11. The beverage capsule as defined in claim 1 wherein the web fibers form an integral structure with at least a portion of the registration element.

12. The beverage capsule as defined in claim 1 wherein the container further comprises an indentation at the base that extends upwardly towards the interior volume, the indentation providing a depth limit to which the filter assembly can be disposed into the container.

13. The beverage capsule as defined in claim 1 wherein the container further comprises a rim circumscribing an opening and a container sidewall extending between the base and the rim.

14. The beverage capsule as defined in claim 13 wherein the container sidewall comprises a ledge for supporting the filter assembly.

15. The beverage capsule as defined in claim 1 wherein the beverage capsule is biodegradable and/or compostable.

16. The beverage capsule as defined in claim 1 wherein the registration element comprises a polymeric material.

17. The beverage capsule as defined in claim 1 wherein the registration element comprises one or more of polylactic acid and poly-L-lactide.

18. The beverage capsule as defined in claim 1, further comprising one or more ultrasonic welds coupling the registration element to the filter element.

19. A beverage capsule for use in a brewed beverage machine including a piercing element, the beverage capsule comprising:
  a container defining an interior volume and including a base; and
  a filter assembly disposed in the interior volume and dividing the interior volume into a first chamber for holding beverage ingredients and a second chamber, the filter assembly including:
    a filter element including web fibers, and
    a registration element disposed above the filter element, wherein the registration element includes a bottom defining one or more pockets facing the filter element such that the piercing element of the brewed beverage machine pierces the base of the container, the filter element, and then enters into the one or more pockets to allow a brewed beverage to be filtered through the filter assembly such that the brewed beverage flows into the second chamber and exits the container by the piercing element.

20. The beverage capsule of claim 19, further comprising one or more ultrasonic welds coupling the registration element to the filter element.

21. The beverage capsule of claim 19, wherein the filter element is connected to the bottom such that the filter element covers all of the one or more pockets.

22. The beverage capsule of claim 19, wherein the bottom includes
  a sidewall defining an aperture;
  arms extending inwardly from the sidewall; and
  two annular protections defining at least portions of the one or more pockets, wherein the two annular protections extend circumferentially about the aperture.

23. The beverage capsule of claim 19, wherein the one or more pockets extend circumferentially about a central region of the bottom.

24. The beverage capsule of claim 23, wherein the central region includes
  a sidewall defining a central aperture;
  arms extending away from the sidewall into the central aperture; and
  a plurality of annular protections defining opposing sides of the one or more pockets.

* * * * *